(12) United States Patent
Kim et al.

(10) Patent No.: US 9,110,587 B2
(45) Date of Patent: Aug. 18, 2015

(54) METHOD FOR TRANSMITTING AND RECEIVING DATA BETWEEN MEMO LAYER AND APPLICATION AND ELECTRONIC DEVICE USING THE SAME

(71) Applicant: Samsung Electronics Co. Ltd., Suwon-si, Gyeonggi-do (KR)

(72) Inventors: Hwa-Kyung Kim, Seoul (KR); Sung-Soo Kim, Bucheon-si (KR); Joo-Yoon Bae, Seoul (KR); Jin-Ha Jun, Seoul (KR); Sang-Ok Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 13/940,933

(22) Filed: Jul. 12, 2013

(65) Prior Publication Data

US 2014/0015782 A1 Jan. 16, 2014

(30) Foreign Application Priority Data

Jul. 13, 2012 (KR) ......................... 10-2012-0076514
Dec. 28, 2012 (KR) ......................... 10-2012-0156753

(51) Int. Cl.
*G06F 3/0488* (2013.01)
(52) U.S. Cl.
CPC ................... *G06F 3/04883* (2013.01)
(58) Field of Classification Search
CPC ................ G06F 3/04883; G06F 2203/04101; G06F 2203/04108
USPC ............................ 345/173; 715/863, 864, 975
See application file for complete search history.

(56) References Cited

U.S. PATENT DOCUMENTS

| | | | | |
|---|---|---|---|---|
| 5,063,600 A | * | 11/1991 | Norwood | ........................ 382/186 |
| 5,587,560 A | * | 12/1996 | Crooks et al. | .............. 178/18.03 |
| 7,502,017 B1 | * | 3/2009 | Ratzlaff et al. | ............... 345/173 |
| 7,831,922 B2 | | 11/2010 | Huapaya et al. | |
| 2004/0236710 A1 | * | 11/2004 | Clary et al. | ...................... 706/46 |
| 2004/0239639 A1 | * | 12/2004 | Stavely et al. | ................. 345/173 |
| 2005/0093845 A1 | * | 5/2005 | Brooks et al. | ................. 345/179 |
| 2008/0025613 A1 | * | 1/2008 | Kumar et al. | ................. 382/189 |
| 2008/0055280 A1 | * | 3/2008 | Bi et al. | ........................ 345/179 |

(Continued)

FOREIGN PATENT DOCUMENTS

| | | |
|---|---|---|
| KR | 10-2009-0013927 A | 2/2009 |
| KR | 10-2011-0016108 A | 2/2011 |

(Continued)

*Primary Examiner* — Tom Sheng
(74) *Attorney, Agent, or Firm* — Jefferson IP Law, LLP

(57) ABSTRACT

A method for transmitting and receiving data between a memo layer and an application and an electronic device using the same are provided. The method includes executing an application and displaying the executed application on a touch screen, detecting a gesture on the touch screen during execution of the application, displaying a memo layer overlapped on the application according to the detected gesture, the memo layer including a handwriting input area for displaying data to be provided to the application and a display area for displaying data received from the application, receiving a handwriting image in the handwriting input area of the memo layer, recognizing the received handwriting image and comparing the recognized handwriting image with preset data, and displaying a feedback received from the application in the display area of the memo layer according to a comparison result.

18 Claims, 14 Drawing Sheets

(56) References Cited

U.S. PATENT DOCUMENTS

| | | | |
|---|---|---|---|
| 2010/0066690 A1* | 3/2010 | Beamish | 345/173 |
| 2010/0262591 A1* | 10/2010 | Lee et al. | 707/706 |
| 2010/0262905 A1 | 10/2010 | Li | |
| 2011/0041102 A1 | 2/2011 | Kim | |
| 2011/0080608 A1* | 4/2011 | Do et al. | 358/1.15 |
| 2011/0234516 A1* | 9/2011 | Nakajima et al. | 345/173 |
| 2011/0302530 A1 | 12/2011 | Harris et al. | |
| 2012/0098772 A1 | 4/2012 | Eun et al. | |
| 2012/0229425 A1* | 9/2012 | Barrus et al. | 345/179 |

FOREIGN PATENT DOCUMENTS

| | | |
|---|---|---|
| KR | 10-2012-0013377 A | 2/2012 |
| KR | 10-2012-0040970 A | 4/2012 |

* cited by examiner

METHOD FOR TRANSMITTING AND RECEIVING DATA BETWEEN MEMO LAYER AND APPLICATION AND ELECTRONIC DEVICE USING THE SAME

CROSS-REFERENCE TO RELATED APPLICATION(S)

This application claims the benefit under 35 U.S.C. §119 (a) of a Korean patent application filed on Jul. 13, 2012 in the Korean Intellectual Property Office and assigned Serial No. 10-2012-0076514 and a Korean patent application filed on Dec. 28, 2012 in the Korean Intellectual Property Office and assigned Serial No. 10-2012-0156753, the entire disclosure of each of which is hereby incorporated by reference.

TECHNICAL FIELD

The present disclosure relates to a terminal having a touch function. More particularly, the present disclosure relates to a method and an apparatus for associating a memo layer that supports a memo function through a touch panel with a currently executed application underlying the memo layer and transmitting and receiving data between the memo layer and the application.

BACKGROUND

Along with the recent growth of portable electronic devices, the demand for User Interfaces (UIs) that enable intuitive input/output is on the rise. For example, traditional UIs on which information is input by means of an additional device, such as a keyboard, a keypad, a mouse, and the like, have evolved to intuitive UIs on which information is input by directly touching a screen with a finger, an electronic touch pen, by voice, or the like. In addition, the UI technology has been developed to be intuitive and human-centered as well as user-friendly. With the UI technology, a user can talk to a portable electronic device by voice so as to input intended information or obtain desired information.

Typically, a number of applications are installed and new functions are available from the installed applications in a popular portable electronic device, such as a smart phone, wherein a plurality of applications installed in the smart phone are executed independently, not providing a new function or a result to a user in conjunction with one another. For example, a scheduler application allows an input of information on its supported UI in spite of a user terminal supporting an intuitive UI.

Moreover, a user uses a touch panel or a user terminal supporting a memo function through a touch panel for the usage of writing notes with an input means, such as a finger or an electronic pen, but there is no specific method for utilizing the notes in conjunction with other applications. Besides a user's finger, an electronic pen, such as a stylus pen, is available as an input means to the user terminal. A user can use such an electronic pen as an input means to touch on a touch panel more accurately. However, since terminals fully support functions that can work with a finger, an electronic pen input means is not a necessity except in some special cases. Moreover, the usage of a pen input means is merely to touch a specific area on a display.

Therefore, a need exists for executing various functions using a pen input means in a terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for associating a first application supporting a memo function with a second application and providing a feedback from the second application to the first application in a terminal supporting the memo function through a touch panel.

In accordance with an aspect of the present disclosure, a method for controlling an application in an electronic device having a touch screen is provided. The method includes executing an application and displaying the executed application on the touch screen, detecting a gesture on the touch screen during execution of the application, displaying a memo layer overlapped on the application according to the detected gesture, the memo layer including a handwriting input area for displaying data to be provided to the application and a display area for displaying data received from the application, receiving a handwriting image in the handwriting input area of the memo layer, recognizing the received handwriting image and comparing the recognized handwriting image with preset data, and displaying a feedback received from the application is displayed in the display area of the memo layer according to a comparison result.

An aspect of the present invention provides an advantageous effect wherein, if a plurality of handwriting images are input, a plurality of feedback corresponding to the handwriting images may be displayed at different positions in the display area of the memo layer.

Another aspect of the present invention provides an advantageous effect wherein the memo layer may be semi-transparent and when the memo layer is displayed overlapped on an execution screen of the application, the application may be seen through the memo layer.

Another aspect of the present invention provides an advantageous effect wherein, if a plurality of memo layers are displayed, the memo layers may be layered with one another according to a feedback received from the application.

Another aspect of the present invention provides an advantageous effect wherein, if a plurality of feedback is generated from the application, the feedback may be displayed in a part of the display area of the memo layer.

Another aspect of the present invention provides an advantageous effect wherein the plurality of feedback may include commands for executing functions of the application and, if a part of the area in which the plurality of feedback is displayed is selected, at least one command included in the selected part may be executed.

Another aspect of the present invention provides an advantageous effect wherein, if an application other than the executed application is executed, another memo layer associated with the other application may be executed.

Another aspect of the present invention provides an advantageous effect wherein a feedback may be displayed differently in the other memo layer according to a function of the other application.

Another aspect of the present invention provides an advantageous effect wherein the handwriting image and the feedback may be sequentially displayed in the handwriting input area and the display area of the memo layer.

Another aspect of the present invention provides an advantageous effect wherein the handwriting image and the feedback may form a dialogue.

Another aspect of the present invention provides an advantageous effect wherein the handwriting image or the feedback may be at least one of a text, a feedback, an image, a pattern, a number, a special character, an email address, or the like.

In accordance with another aspect of the present disclosure, an electronic device having a touch screen is provided. The electronic device includes a display unit configured to display an executed application on the touch screen, display a memo layer overlapped on the application, the memo layer including a handwriting input area for displaying data to be provided to the application and a display area for displaying data received from the application, receive a handwriting image in the handwriting input area of the memo layer, and display the handwriting image in the handwriting input area of the memo layer, and a processor configured to detect a gesture on the touch screen during execution of the application, recognize the received handwriting image, compare the recognized handwriting image with preset data, and control display of a feedback received from the application in the display area of the memo layer according to a comparison result.

Another aspect of the present invention provides an advantageous effect wherein, if a plurality of handwriting images are input, the display unit may display a plurality of feedback corresponding to the handwriting images at different positions in the display area of the memo layer.

Another aspect of the present invention provides an advantageous effect wherein, if a plurality of feedback is generated from the application, the controller may control display of the feedback in a part of the display area of the memo layer.

Another aspect of the present invention provides an advantageous effect wherein the plurality of feedback may include commands for executing functions of the application and if a part of the area in which the plurality of feedback is displayed is selected, the controller may control execution of at least one command included in the selected part.

Another aspect of the present invention provides an advantageous effect wherein, if an application other than the executed application is executed, the controller may control execution of another memo layer associated with the other application.

Another aspect of the present invention provides an advantageous effect wherein the controller may control different display of a feedback in the other memo layer according to a function of the other application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
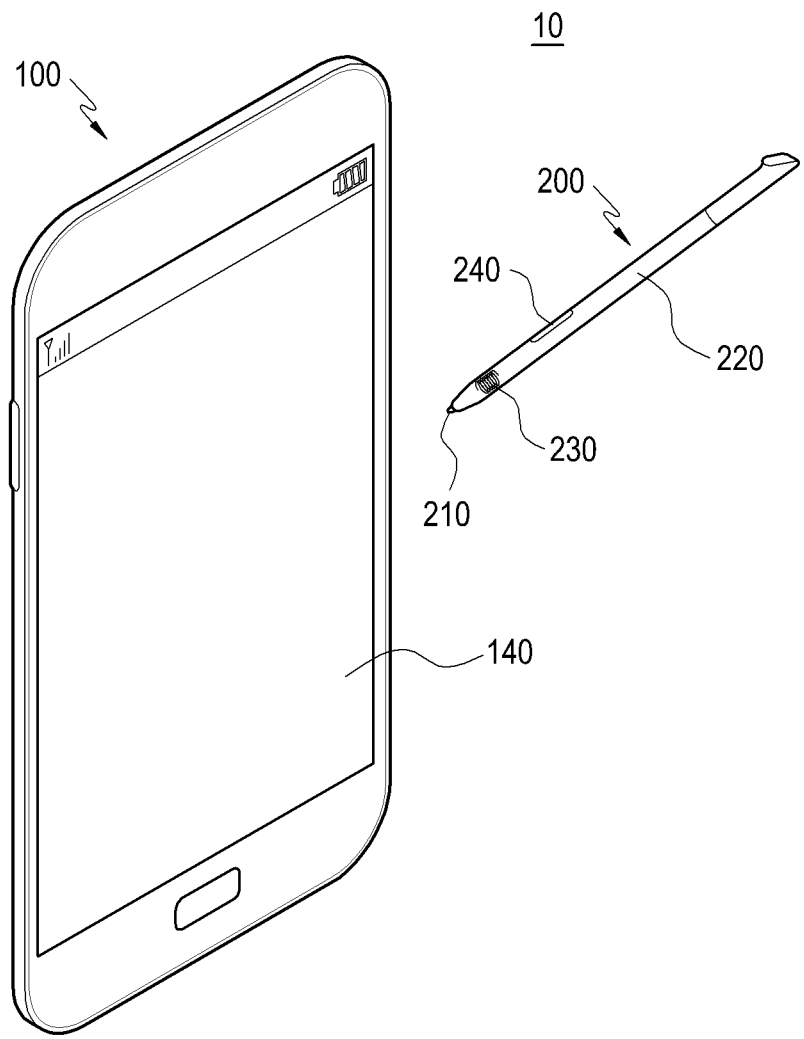
FIG. 1 illustrates a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A description of technologies known to the technical field of the present disclosure or not related directly to the present disclosure will be avoided lest it should obscure the subject matter of the present disclosure. In addition, components having substantially the same structure and function will not be described further.

Similarly, some components are exaggerated, omitted, or schematically shown in the attached drawings. The dimensions of each component do not reflect its actual dimensions. Therefore, the present disclosure is not limited by relative sizes or intervals shown in the drawings.

Various embodiments of the present disclosure which will be described later are intended to enable a question and answer procedure with a user through a handwriting-based User Interface (UI) based on a Natural Language Interaction (NLI) (hereinafter, referred to as handwriting-based NLI) by a memo function in a user terminal to which a handwriting-based NLI is applied.

NLI generally involves understanding and creation. With the understanding and creation functions, a computer understands an input and displays readily understandable text.

Thus, it can be said that NLI is an application of a natural language understanding that enables a dialogue in a natural language between a person and an electronic device.

For example, a terminal executes a command received from a user or acquires information used to execute the input command from the user in a question and answer procedure through a handwriting-based NLI.

To apply a handwriting-based NLI to a terminal, switching should be performed organically between a memo mode and a command processing mode through a handwriting-based NLI in the present disclosure. In the memo mode, a user writes a note on a screen displayed by an activated application with an input means, such as a finger or an electronic pen in a terminal, whereas in the command processing mode, a note written in the memo mode is processed in conjunction with information associated with the currently activated application.

For example, upon pressing of a button of an electronic pen, that is, upon generation of a signal in hardware, switching may occur between the memo mode and the command processing mode.

While the following description is given in the context of an electronic pen being used as a major input means to support a memo function, the present disclosure is not limited to a terminal using an electronic pen as an input means.

In other words, it is to be clearly understood that any device with which a user can input information on a touch panel can be used as an input means in the various embodiments of the present disclosure.

In an implementation, information is shared between a terminal and a user in a preliminary mutual agreement so that the terminal may receive intended information from the user by exchanging a question and an answer with the user and thus, may provide the result of processing the received information to the user through the handwriting-based NLI of the present disclosure.

For example, it may be agreed that in order to request operation mode switching, at least one of a symbol, a pattern, a text, or a combination thereof is used or a motion is used by a motion recognition function. Mainly, memo mode-to-command processing mode switching or command processing mode-to-memo mode switching may be requested.

In regards to an agreement on input information corresponding to a symbol, a pattern, a text, or a combination thereof, a user's memo pattern needs to be analyzed and the analysis result needs to be considered, to thereby enable the user to intuitively input intended information with convenience.

Scenarios of controlling various activated applications by a memo function based on handwriting-based NLI and outputting the control results will be described as separate embodiments of the present disclosure.

FIG. 1 illustrates a configuration of an electronic device according to an embodiment of the present disclosure.

Referring to FIG. 1, an electronic device 10 may include a terminal 100 and an electronic pen 200.

The electronic device 10 having the above configuration may support execution of a user function corresponding to a specific pen function command by recognizing a pen state and gesture of the electronic pen 200, when a user applies a specific input to a display unit 140 of the terminal 100 upon grabbing the electronic pen 200.

In addition, the electronic device 10 may support execution of a user function corresponding to a specific pen function command based on information about the type of a currently executed application program in addition to the pen state of the electronic pen 200 and the gesture recognition value of the electronic pen 200, when the user applies a specific input to the display unit 140 of the terminal 100 upon grabbing the electronic pen 200.

Therefore, the electronic device 10 can support the user's fast and simple inputs to the terminal 100 with the electronic pen 200.

The terminal 100 may include a display panel (not shown) for outputting a screen according to a function execution and a pen recognition panel (not shown) for operating the electronic pen 200.

The terminal 100 may further include a touch panel for supporting a contact touch event. Moreover, the terminal 100 may further include a driving module for driving the display panel and the pen recognition panel, and a housing for accommodating a power supply and other various components of the terminal 100.

The terminal 100 may collect gesture information by recognizing a gesture corresponding to a pen touch event detected from the pen recognition panel and may collect pen state information from the electronic pen 200. The terminal 100 supports execution of a user function corresponding to a specific pen function command based on the collected gesture information and pen state information. Herein, the terminal 100 may support execution of a user function corresponding to another specific pen function command according to the type of at least one currently activated application program.

The configuration and operation of the terminal 100 will be described below.

The electronic pen 200 may include a pen body 220 and a pen point 210 at one end of the pen body 220. The electronic pen 200 may further include a coil 230, in the vicinity of the pen point 210 inside the pen body 220, and a button 240 for changing an electromagnetic induction value generated from the coil 230. Thus, the configured electronic pen 200 supports electromagnetic induction. The coil 230 creates a magnetic field at a specific point of the pen recognition panel and the terminal 100 recognizes the touched point by detecting the position of the magnetic field.

The pen point 210 touches the display panel or, when the touch panel is disposed over the display panel, touches the touch panel so as to show that the electronic pen 200 indicates a specific point on the display unit 140.

Because the pen point 210 is at the end of the pen body 220 and the coil 230 is apart from the pen point 210 by a certain distance, when the user applies an input, such as writing a note using the electronic pen 200, the distance between the touched point of the pen point 210 and the position of a magnetic field generated by the coil 230 may be compensated.

Owing to the distance compensation, the user may perform an input operation, such as a handwriting, a drawing, a selection and displacement of an item, and the like, while indicating a specific point of the display panel with the pen point 210. More specifically, the user may apply a specific gesture input, while touching the pen point 210 on the display panel.

When the electronic pen 200 comes within an identified distance to the pen recognition panel, the coil 230 may generate a magnetic field at a specific point of the pen recognition panel.

Thus, the terminal 100 may scan the magnetic field formed on the pen recognition panel in real time or at every interval. The moment the electronic pen 200 is activated, the pen recognition panel may be activated.

Moreover, the pen recognition panel may recognize a different pen state according to the proximity of the electronic pen 200 to the pen recognition panel. For example, when the electronic pen 200 is positioned within a first distance from the display panel or the pen recognition panel, the pen recognition panel may recognize that the electronic pen 200 is in a contact state.

If the electronic pen 200 is apart from the pen recognition panel by a distance falling within a range between the first distance and a second distance, the pen recognition panel may recognize that the electronic pen 200 is in a hovering state. If the electronic pen 200 is positioned within a recognizable range beyond the second distance from the pen recognition panel, the pen recognition panel may recognize that the electronic pen 200 is in an air state. In this manner, the pen recognition panel of the terminal 100 may provide different pen state information according to its distance to the electronic pen 200.

The user may press the button 240 of the electronic pen 200, upon which a specific signal may be generated from the electronic pen 200 and provided to the pen recognition panel.

For this operation, a specific capacitor, an additional coil, or a specific device for causing a variation in electromagnetic induction may be disposed in the vicinity of the button 240. When the button 240 is touched or pressed, the specific capacitor, the additional coil, or the specific device may be connected to the coil 230 and thus, change an electromagnetic induction value induced from the pen recognition panel, so that the pressing of the button 240 of the electronic pen 200 may be recognized.

Moreover, the specific capacitor, the additional coil, or the specific device may generate a wireless signal corresponding to pressing of the button 240 and provide the wireless signal to a receiver in the terminal 100, so that the terminal 100 may recognize the pressing of the button 240 of the electronic pen 200 according to the received wireless signal.

As described above, the terminal 100 may collect different pen state information according to a different displacement of the electronic pen 200. For example, the terminal 100 may receive information indicating whether the electronic pen 200 is in the hovering state or the contact state and information indicating whether the button 240 of the electronic pen 200 has been pressed or is kept in its initial state.

The terminal 100 may generate a specific pen function command based on pen state information received from the electronic pen 200 and gesture recognition information corresponding to a gesture input, received from the coil 230 of the electronic pen 200 and may execute a function corresponding to the specific pen function command.

As described above, the electronic device 10 may include the terminal 100 and the electronic pen 200. The electronic device 10 may process pen state information reflecting the displacement state and specific input state of the electronic pen 200 and gesture recognition information based on a gesture input.

The electronic device 10 can rapidly generate and execute commands for controlling various functions of the terminal 100 or the electronic pen 200.

Further, the electronic device 10 can rapidly execute a specific function of the terminal 100 in a specific pen state, based on composite gesture recognition information. Moreover, the electronic device 10 may recognize a composite gesture independently of a specific pen state and execute a command corresponding to the recognized composite gesture.

Figure 2:
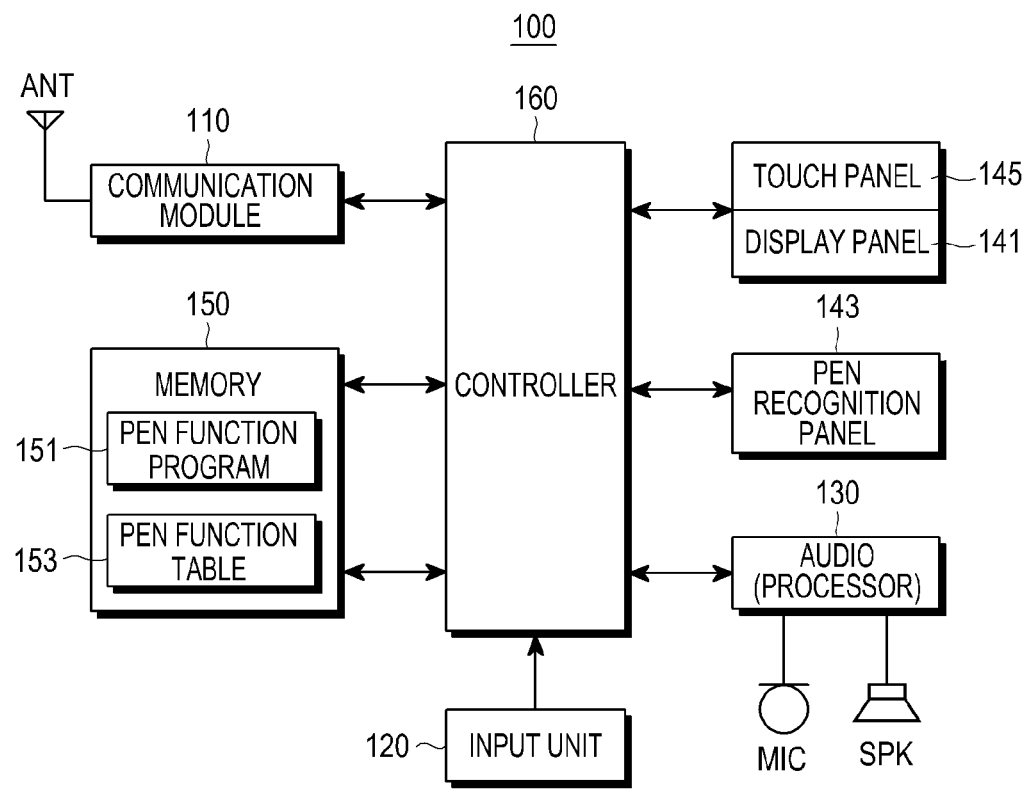
FIG. 2 is a block diagram of a terminal for supporting control of an application in an electronic device according to an embodiment of the present disclosure.

FIG. 2 is a block diagram of a terminal for supporting control of an application in an electronic device according to an embodiment of the present disclosure.

Referring to FIG. 2, the terminal 100 may include a communication module 110, an input unit 120, an audio processor 130, a display panel 141, a pen recognition panel 143, a touch panel 145, a memory 150, and a controller 160. While the terminal 100 is shown as including the touch panel 145, this does not limit the present disclosure.

For example, the terminal 100 may not be provided with the touch panel 145 as described above with reference to FIG. 1. In this case, the terminal 100 may generate an input signal for its operation through the electronic pen 200 and the pen recognition panel 143 or may receive an input signal through the input unit 120 or the communication module 110.

The terminal 100 having the above configuration may collect pen state information about the electronic pen 200 and gesture recognition information corresponding to a gesture input of the electronic pen 200, through the pen recognition panel 143. The terminal 100 may identify a specific pen function command mapped to the collected pen state information and gesture recognition information and may support a terminal function corresponding to the identified pen function command.

In addition to the pen state information and the gesture recognition information, the terminal 100 may collect information about the function type of a currently activated application program and generate a pen function command mapped to the pen state information, the gesture recognition information, and the function type information.

If the gesture recognition information is composite gesture recognition information, the terminal 100 may execute a specific terminal function according to the composite gesture recognition information.

For this purpose, the pen recognition panel 143, which is disposed at a position in the terminal 100, may be activated upon generation of a specific event or by default. The pen recognition panel 143 may occupy an area under the display panel 141, for example, an area that can cover the display area of the display panel 141. The pen recognition panel 143 may receive pen state information according to an approach or manipulation of the electronic pen 200 and provide the pen state information to the controller 160. Further, the pen recognition panel 143 may receive gesture recognition information corresponding to a gesture of the electronic pen 200 and provide the gesture recognition information to the controller 160.

This pen recognition panel 143 may be configured so as to receive a position value of the electronic pen 200 according to electromagnetic induction with the electronic pen 200 having the coil 230 as described above. The pen recognition panel 143 may collect an electromagnetic induction value corresponding to the proximity distance of the electronic pen 200 and provide the electromagnetic induction value to the controller 160. The electromagnetic induction value may correspond to information indicating whether the electronic pen 200 is in the hovering state with respect to the pen recognition panel 143, the display panel 141, or the touch panel 145 or in the contact state with respect to the display panel 141 or the touch panel 145.

The terminal 100 may collect different pen state information depending on the design of the button 240 of the electronic pen 200. For example, if the button 240 is configured to change an electromagnetic induction value generated from the coil 230 as described above, the pen recognition panel 143 may receive pen state information indicating whether the button 240 has been input or not and provide the pen state information to the controller 160. For example, a capacitor, an additional coil, and the like, may be selectively connected to the button 240 as a structure for changing an electromagnetic induction value and a specific device may be applied to change an electromagnetic induction value in various manners on the pen recognition panel 143 according to a designer's intention.

On the other hand, if the button 240 is configured so as to transmit a wireless signal, the terminal 100 may further include a receiver for receiving a wireless signal, upon input of the button 240. The controller 160 may determine whether the button 240 has been input based on the wireless signal received through the receiver.

The touch panel 145 may be disposed on or under the display panel 141. The touch panel 145 may transmit information about a touched position and a touch state according to a variation in capacitance, resistance, or voltage caused by a touch of an object to the controller 160.

The touch panel 145 may be disposed on or under at least a part of the display panel 141. The moment the pen recognition panel 143 is activated, the touch panel 145 may be deactivated according to a design. For example, the touch panel 145 may be in an inactive state, while the terminal 100 supports a command generation function through the pen recognition panel 143 based on pen state information and gesture recognition information, or pen state information, gesture recognition information, and function type information, or composite gesture recognition information.

The display panel 141 is configured to output various screens related to operations of the terminal 100. For example, the display panel 141 may provide a variety of screens upon activation of functions corresponding to the screens, such as an initial waiting screen or a menu screen for supporting functions of the terminal 100, a file search screen, a file opening screen, a broadcasting reception screen, a file editing screen, a Web page connection screen, a memo screen, an e-book reader screen, or a chat screen according to a selected function, and an email message writing and reception screen.

Each of the above screens provided by the display panel 141 may have information about a specific function type and provide the function type information to the controller 160.

If each function of the display panel 141 is activated, the pen recognition panel 143 may be activated according to a preliminary setting. Meanwhile, gesture recognition information input through the pen recognition panel 143 may be output in a matching form on the display panel 141. For example, if the gesture recognition information is a gesture corresponding to a specific pattern, an image of the specific pattern may be output to the display panel 141.

Thus, the user may confirm what gesture he or she has input by viewing the pattern. More specifically, the starting and ending time points of a gesture input may be determined according to variations in pen state information about the electronic pen 200 in the present disclosure. For example, the gesture input may start in at least one of the contact state or the hovering state of the electronic pen 200 and may end with releasing the at least one state.

Therefore, the user may apply a gesture input by touching the electronic pen 200 on the display panel 141 or placing the electronic pen 200 above the display panel 141 within a certain distance. For instance, if the electronic pen 200 moves within a contact-state range, the terminal 100 may recognize the movement of the electronic pen 200 as a gesture input and thus, perform gesture recognition on the movement of the electronic pen 200.

If the electronic pen 200 moves within a hovering-state range, the terminal 100 may monitor the movement of the electronic pen 200 as a valid movement for a gesture input, although it does not recognize the movement of the electronic pen 200 as a gesture input.

Therefore, the user touches the electronic pen 200 on the display panel 141 and moves it in order to apply an actual gesture input. To apply a composite gesture input, the user may remove the electronic pen 200 from the display panel 141, touches it again on the display panel 141, and moves the touch on the display panel.

The memory 150 is configured to store various programs and data used to operate the terminal 100. For example, the memory 150 may store an Operating System (OS) needed for operating the terminal 100 and function programs for supporting screens output on the afore-described display panel 141.

More particularly, the memory 150 may store a pen function program 151 for supporting pen functions and a pen function table 153 for supporting the pen function program in the present disclosure.

The pen function program 151 may include a variety of routines for supporting execution of pen functions. For example, the pen function program 151 may include a routine for determining an activation condition for the pen recognition panel 143, a routine for collecting pen state information about the electronic pen 200, when the pen recognition panel 143 is activated, and a routine for collecting gesture recognition information by recognizing a gesture according to movement of the electronic pen 200.

The pen function program 151 may include a routine for generating a specific pen function command based on the collected pen state information and gesture recognition information and a routine for executing the pen function command.

The pen function program 151 may further include a routine for collecting information about the type of a currently activated function, a routine for generating a pen function command mapped to the collected function type information, pen state information, and gesture recognition information, and a routine for executing a function according to the pen function command.

If a received gesture input is an input corresponding to composite gesture recognition information, the pen function program 151 may include a routine for separating the gesture input into sub-gesture inputs and for recognizing each sub-gesture input as sub-gesture recognition information, a routine for generating a specific pen function command based on the sub-gesture recognition information, and a routine for executing a function according to the generated pen function command.

The routine for generating a pen function command may generate a command referring to the pen function table 153 stored in the memory 150. The pen function table 153 may include pen function commands to which a designer or a program developer has mapped specific terminal functions corresponding to inputs applied by means of the electronic pen.

More particularly, the pen function table 153 may map input gesture recognition information to pen function commands according to pen state information and function type information so that a different function may be executed according to pen state information and function type information in spite of the same gesture recognition information.

Moreover, the pen function table 153 may map pen state information and gesture recognition information to pen function commands corresponding to specific terminal functions.

If the pen function table 153 includes pen state information and gesture recognition information, the pen function table 153 may support specific functions based on the pen state information and gesture recognition information irrespective of the type of a currently activated function.

Meanwhile, the pen function table 153 may include composite gesture recognition information mapped to pen function commands.

The pen function table 153 including the composite gesture recognition information may support specific terminal functions based on the composite gesture recognition information irrespective of pen state information or the type of a currently activated function.

As described above, the pen function table 153 may include at least one of a first pen function table including pen function commands mapped to pen state information, function type information, and gesture recognition information, a second pen function table including pen function commands mapped to pen state information and gesture recognition information, or a third pen function table including pen function commands mapped to composite gesture recognition information.

The pen function table 153 including pen function commands may be applied selectively or automatically according to a user setting or the type of an executed application program. For example, the user may preset the first or second pen function table.

The terminal 100 may perform a gesture recognition process on an input gesture based on the specific pen function table according to the user setting.

Meanwhile, the terminal 100 may apply the second pen function table when a first application program is activated, the third pen second function table when a second application program is activated, and the first pen second function table when a third application program is activated, according to a design or a user setting. In this manner, the pen function table 153 may be applied in various manners according to the type of an activated function.

In a case where the terminal 100 supports a communication function, the terminal 100 may include the communication module 110. More particularly, when the terminal 100 supports a mobile communication function, the communication module 110 may be a mobile communication module.

The communication module 110 may perform communication functions, such as chatting, a message transmission and reception, a call, and the like. If gesture recognition information is collected from the electronic pen 200 while the communication module 110 is operating, the communication module 110 may support execution of a pen function command corresponding to the gesture recognition information under the control of the controller 160.

While supporting the communication functionality of the terminal 100, the communication module 110 may receive external information for updating the pen function table 153 and provide the received external update information to the controller 160.

As described above, a different pen function table 153 may be set according to the terminal function type of an executed application program. Consequently, when a new function is added to the terminal 100, a new setting related to operation of the electronic pen 200 may be used.

When a pen function table 153 for a new function or a previously installed function is provided, the communication module 110 may support reception of information about the pen function table 153 by default or upon a user request.

The input unit 120 may be configured into side keys or a separately procured touch pad. The input unit 120 may include a button for turning on or turning off the terminal 100, a home key for returning the terminal 100 to a home screen, and the like.

The input unit 120 may generate an input signal for setting a pen operation mode under a user control and provide the input signal to the controller 160.

Specifically, the input unit 120 may generate an input signal for setting one of a basic pen operation mode in which a pen's position is detected without additional gesture recognition and a function is performed according to the detected pen position and a pen operation mode based on one of the afore-described various pen function tables 153.

The terminal 100 may retrieve a specific pen function table 153 according to an associated input signal and support a pen operation based on the retrieved pen function table 153.

The audio processor 130 includes at least one of a speaker (SPK) for outputting an audio signal or a microphone (MIC) for collecting an audio signal.

The audio processor 130 may output a notification sound for prompting the user to set a pen operation mode or an effect sound according to a setting. When the pen recognition panel 143 collects gesture recognition information according to a specific gesture, the audio processor 130 outputs a notification sound corresponding to the gesture recognition information or an effect sound associated with function execution.

The audio processor 130 may output an effect sound in relation to a gesture received in real time during a gesture input operation. In addition, the audio processor 130 may control the magnitude of vibrations corresponding to a gesture input by controlling a vibration module.

The audio processor 130 may differentiate the vibration magnitude according to a received gesture input. For example, when processing different pieces of gesture recognition information, the audio processor 130 may set a different vibration magnitude for each piece of gesture recognition information.

The audio processor 130 may output an effect sound of a different volume and type according to the type of gesture recognition information. For example, when gesture recognition information related to a currently executed function is collected, the audio processor 130 outputs a vibration having a magnitude or an effect sound having a certain volume. When gesture recognition information for invoking a different function is collected, the audio processor 130 may output a vibration having a relatively large magnitude or an effect sound having a relatively large volume.

The controller 160 may include various components to support pen functions or interaction between a plurality of programs according to various embodiments of the present disclosure and thus, may process data and signals for the pen functions and the interaction between the programs and control execution of the pen functions. For this purpose, the controller 160 may have a configuration as illustrated in FIG. 3.

Figure 3:
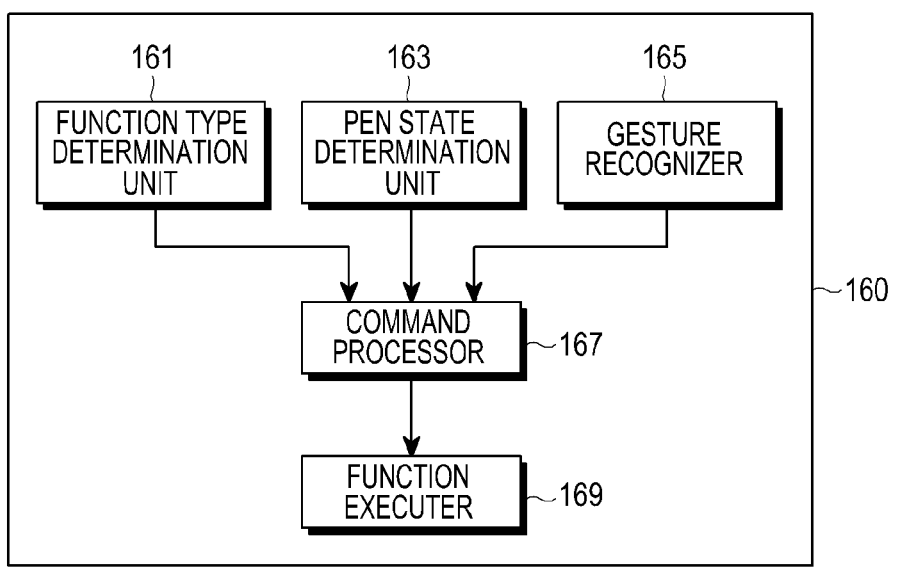
FIG. 3 is a block diagram of a controller in a terminal according to an embodiment of the present disclosure.

FIG. 3 is a block diagram of a controller in a terminal according to an embodiment of the present disclosure.

Referring to FIG. 3, the controller 160 may include a function type determination unit 161, a pen state determination unit 163, a gesture recognizer 165, a command processor 167, and a function executer 169.

The function type determination unit 161 determines the type of a user function currently activated in the terminal 100. More specifically, the function type determination unit 161 collects information about the type of a function related to a current screen displayed on the display panel 141.

If the terminal 100 supports multi-tasking, a plurality of functions may be activated along with activation of a plurality of applications. In this case, the function type determination unit 161 may collect information about the type of a function related to a current screen displayed on the display panel 141 and provide the function type information to the command processor 167. If a plurality of screens are displayed on the display panel 141, the function type determination unit 161 may collect information about the type of a function related to a screen displayed at the foremost layer.

The pen state determination unit 163 collects information about the position of the electronic pen 200 and pressing of the button 240. As described above, the pen state determination unit 163 may detect a variation in an input electromagnetic induction value by scanning the pen recognition panel 143, determine whether the electronic pen 200 is in the hovering state or contact state and whether the button 240 has been pressed or released, and collect pen state information according to the determination. The collected pen state information may be provided to the command processor 167.

The gesture recognizer 165 recognizes a gesture according to movement of the electronic pen 200. The gesture recognizer 165 may recognize a gesture input according to movement of the electronic pen 200 irrespective of whether the electronic pen 200 is in the hovering state or contact state and provide the resulting gesture recognition information to the command processor 167.

The gesture recognition information provided by the gesture recognizer 165 may be single-gesture recognition information obtained by recognizing one object or composite-gesture recognition information obtained by recognizing a plurality of objects. The single-gesture recognition information or composite-gesture recognition information may be determined according to a gesture input operation.

For example, the gesture recognizer 165 may generate single-gesture recognition information for a gesture input corresponding to continuous movement of the electronic pen 200 while the electronic pen 200 is kept in the hovering state or the contact state.

The gesture recognizer 165 may generate composite-gesture recognition information for a gesture input corresponding to movement of the electronic pen 200 that has been made when the electronic pen 200 is switched between the hovering state and the contact state. The gesture recognizer 165 may generate composite-gesture recognition information for a gesture corresponding to movement of the electronic pen 200 that has been made when the electronic pen 200 is switched from the hovering state to the air state.

Moreover, the gesture recognizer 165 may generate composite-gesture recognition information for a plurality of gesture inputs that the electronic pen 200 has made across the boundary of a range recognizable to the pen recognition panel 143.

If the user makes a gesture with the electronic pen 200 across the boundary beyond the pen recognition panel 143, the gesture recognizer 165 may support the user's completion of the gesture input by outputting an additional button map for gesture inputs.

The command processor 167 generates a pen function command based on at least one of the function type information received from the function type determination unit 161, the pen state information received from the pen state determination unit 163, or the gesture recognition information received from the gesture recognizer 165, according to an operation mode.

During this operation, the command processor 167 may refer to the pen function table 153 listing a number of pen function commands. More specifically, the command processor 167 may refer to the first pen function table based on function type information, pen state information, and gesture recognition information, the second pen function table based on pen state information and gesture recognition information, or the third pen function table based on gesture recognition information, according to a setting or the type of a current active function.

The command processor 167 may provide the generated pen function command to the function executer 169.

The function executer 169 controls execution of a function corresponding to the pen function command received from the command processor 167. The function executer 169 may execute a specific function, invoke a new function, or end a specific function in relation to a current active application.

Figure 4:
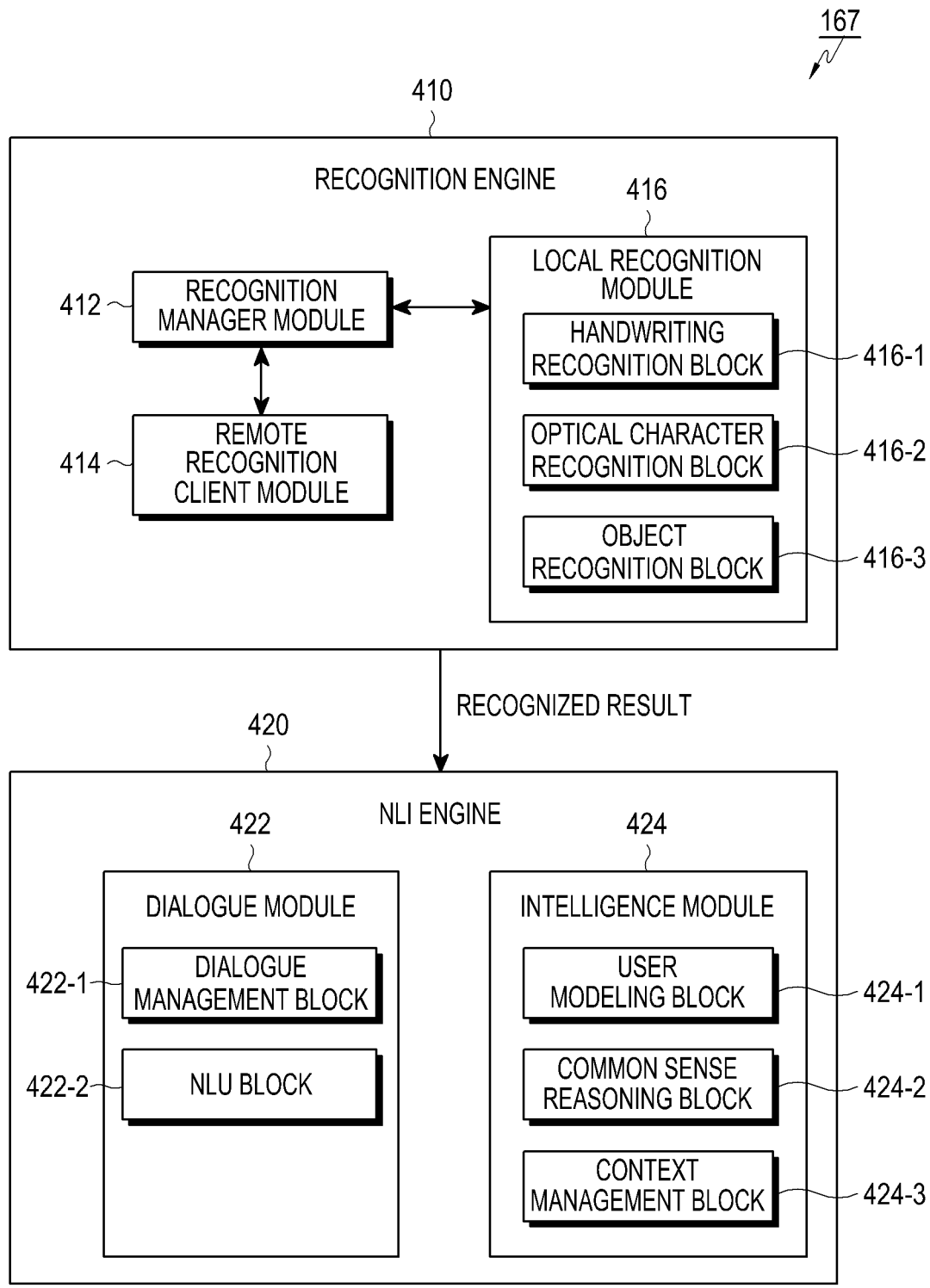
FIG. 4 is a block diagram of a command processor for supporting a handwriting-based Natural Language Interaction (NLI) in a terminal according to an embodiment of the present disclosure.

FIG. 4 is a block diagram of a command processor for supporting a handwriting-based NLI in a terminal according to an embodiment of the present disclosure.

Referring to FIG. 4, the command processor 167 supporting a handwriting-based NLI may include a recognition engine 410 and an NLI engine 420.

The recognition engine 410 may include a recognition manager module 412, a remote recognition client module 414, and a local recognition module 416. The local recognition module 416 may include a handwriting recognition block 416-1, an optical character recognition block 416-2, and an object recognition block 416-3.

The NLI engine 420 includes a dialog module 422 and an intelligence module 424.

The dialog mobile 422 includes a dialog management block 422-1 for controlling a dialog flow and a Natural Language Understanding (NLU) block 422-2 for recognizing a user's intention.

The intelligence module 424 includes a user modeling block 424-1 for reflecting user preferences, a common sense reasoning block 424-2 for reflecting common sense, and a context management block 424-3 for reflecting a user context.

The recognition engine 410 may receive information from a drawing engine (not shown) corresponding to an input means, such as the electronic pen 200, and an intelligent input platform (not shown), such as a camera.

The intelligent input platform may be an optical character recognizer, such as an Optical Character Reader (OCR). The intelligent input platform may read information taking the form of a printed or handwritten text, numbers, or symbols and provide the read information to the recognition engine 410.

The drawing engine is a component for receiving an input from an input means, such as a finger, an object, the electronic pen 200, and the like. The drawing engine may receive a handwriting image, object-based information, and the like, as an input.

Besides a text, information taking the form of a line, a symbol, a pattern, or a combination thereof may be input to the recognition engine 410.

The recognition engine 410 recognizes the note contents of a user-selected area of a currently displayed note or a user-indicated command from a text, a line, a symbol, a pattern, a figure, or a combination thereof received as information. Moreover, the recognition engine 410 may output a recognized result obtained in the above operation.

For this purpose, the recognition engine 410 may include the recognition manager module 412 for providing overall control to output a recognized result of input information, the remote recognition client module 414, and the local recognition module 416 for recognizing input information. The local recognition module 416 may include at least the handwriting recognition block 416-1 for recognizing handwritten input information, the optical character recognition block 416-2 for recognizing information from an input optical signal, and the object recognition block 416-2 for recognizing information from an input gesture.

The handwriting recognition block 416-1 recognizes handwritten input information. For example, the handwriting recognition block 416-1 recognizes a note that the user has written with the electronic pen 200.

The optical character recognition block 416-2 receives an optical signal detected by an optical detecting module (not shown), recognizes an optical character from the received optical signal, and outputs the optical character recognized result. The object recognition block 416-3 receives a gesture detecting signal detected by a motion detecting module (not shown), recognizes a gesture from the gesture detecting signal, and outputs a gesture recognized result.

The recognized results output from the handwriting recognition block 416-1, the optical character recognition block 416-2, and the object recognition block 416-3 may be provided to the NLI engine 420.

The NLI engine 420 may determine a user's intention by processing, for example, analyzing the recognized results received from the recognition engine 410. For example, the NLI engine 420 may determine user-intended input information from the recognized results received from the recognition engine 410.

Specifically, the NLI engine 420 may collect sufficient information by exchanging questions and answers with the user based on handwriting-based NLI and determine the intention of the user based on the collected information.

For this operation, the dialog module 422 of the NLI engine 420 may create a question to make a dialog with the user and provide the question to the user, thereby controlling a dialog flow to receive an answer or feedback from the user.

The dialog module 422 may manage information acquired from questions and answers (the dialog management block 422-1). The dialog module 422 also understands the intention of the user by performing a natural language process on an initially received command, taking into account the managed information (the NLU block 422-2).

The intelligence module 424 of the NLI engine 420 may generate information to be referred to for understanding the intention of the user through the natural language process and provide the reference information to the dialog module 422. For example, the intelligence module 424 may model information reflecting a user preference by analyzing a user's habit in taking a note (the user modeling block 424-1), may induce information for reflecting common sense (the common sense reasoning block 424-2), or may manage information representing a current user context (the context management block 424-3).

Therefore, the dialog module 422 may control a dialog flow according to a question and answer procedure with the user with the help of information received from the intelligence module 424.

Figure 5:
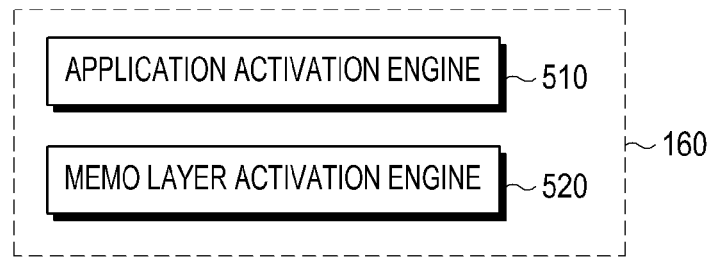
FIG. 5 is a block diagram of activation engines for controlling an application and a memo layer according to an embodiment of the present disclosure.

FIG. 5 is a block diagram of activation engines for controlling an application and a memo layer according to an embodiment of the present disclosure.

Referring to FIG. 5, for example, the configuration may display a memo layer overlapped on a screen of a currently executed specific application, recognize a user's intention from a note written in the displayed memo layer, and control an operation of the executed application according to the user's intention in the terminal 100.

The memo layer refers to an application supporting a memo function through the touch panel. For example, the specific application being executed in the terminal 100 will be referred to as 'a lower-layer application'.

When the application supporting the memo function is executed during execution of the lower-layer application in progress, the terminal 100 displays the memo layer overlapped on the execution screen of the lower-layer application. Referring to FIG. 5, the terminal 100 may include an application activation engine 510 and a memo layer activation engine 520.

The application activation engine 510 may execute a user-requested application and provide overall control to the executed application by recognizing the user's intention.

More particularly, when the user invokes the memo layer and issues an operation command by writing a note in the memo layer, the application activation engine 510 may control an operation of the executed application according to the operation command.

For the purpose, the application activation engine 510 may provide specific information to the memo layer activation engine 520 to notify the memo layer activation engine 520 of information used to control the operation of the executed application at the moment, taking into account a function menu of the executed application.

The specific information may specify at least one of the type of the application or a function menu currently executed based on the application.

In this case, the application activation engine 510 may receive more accurate information regarding the currently executed application, for controlling the currently executed application.

The memo layer activation engine 520 may continuously monitor reception of a user input in an input type agreed on to request execution of an application supporting the memo function.

The input type may be a touch event. For example, the input type may be a touch and drag event on the execution screen of the application. The touch and drag event is a user's gesture of touching a screen with a finger or a touch tool and moving the touch to another position with the finger or the touch tool.

The touch and drag event may be directed to the right, to the left, upward, or downward on the screen.

Any recognizable tool or input unit may be used to make the touch and drag event. The tool or input unit may be mainly a finger or the electronic pen 200.

Upon receipt of a request for execution of the application supporting the memo function from the user, the memo layer activation engine 520 may invoke a memo layer that allows the user to write a note. The memo layer activation engine 520 may display the invoked memo layer overlapped on the execution screen of the application.

In an implementation, the memo layer, which is overlapped with the execution screen of the lower-layer application, has transparency enough to show the execution screen of the application through the memo layer. The transparency indicates how transparent the memo layer is, ranging from transparent to opaque.

An area in which the memo layer is overlapped with the execution screen of the application may be set by a user request. For example, the memo layer may be overlapped fully or partially with the screen according to a setting. Alternatively, after the memo layer is overlapped partially with the screen, the user may change the size of the memo layer by selecting and dragging the outline or a vertex of the memo layer.

As described above, the memo layer activation engine 520 may control an overall operation for displaying the memo layer to allow the user to write a note, upon a user request, while the application is being executed.

If the application activation engine 510 indicates information used to control the application, the memo layer activation engine 520 may further display 'a message notifying information that a user is to input' on the memo layer displayed on the screen.

For example, if a music play application is being executed, a message 'Enter a song' or 'Enter an artist name' may be displayed on the memo layer.

After displaying the memo layer on the screen, the memo layer activation engine 520 may recognize the user's intention based on a note written by the user. The note may be a preset handwriting input and the memo layer activation engine 520 may recognize the user's intention by recognizing the handwriting input. The memo layer activation engine 520 may provide control information related to activation of the application as intended by the user to the application activation engine 510.

The memo layer activation engine 520 may continuously provide related information to the application activation engine 510 to recognize the user's intention.

To recognize completion of a handwriting input, the memo layer activation engine 520 may further display an input menu button in the memo layer displayed on the screen.

In this case, when the user presses the input menu button, the memo layer activation engine 520 may start to perform an operation for recognizing the user's intention based on the contents of the handwriting input to the memo layer.

Figure 6:
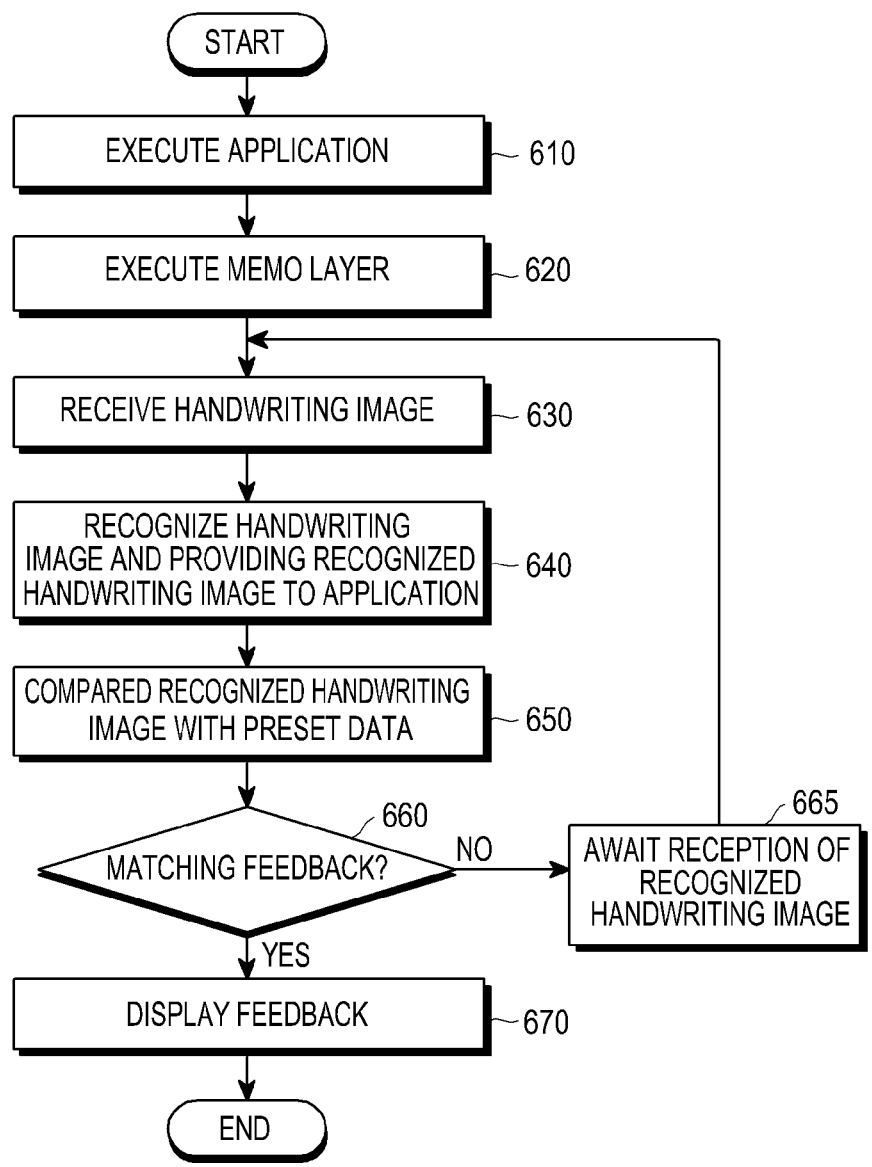
FIG. 6 is a flowchart illustrating an interaction between an application and a memo layer according to an embodiment of the present disclosure.

FIG. 6 is a flowchart illustrating an interaction between an application and a memo layer according to an embodiment of the present disclosure.

Referring to FIG. 6, the controller 160 may execute an application, that is, a lower-layer application, upon a user request at operation 610. After the lower-layer application is executed, the controller 160 may provide overall control to the executed lower-layer application. The application activation engine 510 that controls the lower-layer application may display an operation state of the lower-layer application on a screen of the terminal 100 so that the user may confirm it.

At operation 620, the controller 160 may continuously monitor whether the user has invoked a memo layer during execution of the lower-layer application in progress.

For example, when the user touches an execution screen of the lower-layer application and drags the touch, the terminal 100 may invoke the memo layer.

The touch and drag event may be directed to the right, to the left, upward, or downward on the screen. Any recognizable tool may be used for the touch and drag event.

Between operations 610 and 620, the memo layer may receive information from the lower-layer application, identify the contents of text input to the memo layer, and display data indicating the text contents related to the identified contents on a top area of the memo layer. The data displayed in the top area of the memo layer may differ according to the type or function of the lower-layer application.

The user can determine type of contents to be input to the memo layer from the data displayed on the top area of the memo layer.

For example, if the lower-layer application is a music-related program, a title displayed on the top area of the memo layer may be 'Enter the title of a song'.

If the lower-layer application is a mail-related program, a title displayed on the top area of the memo layer may be 'Enter the called party's name'.

A different title may be displayed according to a setting or the type of the lower-layer application. Alternatively, a title may be displayed irrespective of the type of the lower-layer application.

The memo layer activation engine 520, which controls the memo layer, may continuously monitor or receive an input of a handwriting image to the memo layer at operation 630.

Upon receiving the input of the handwriting image through the input unit 120, the memo layer may recognize the input handwriting image and provide information about the input handwriting image according to the result of recognizing to the lower-layer application at operation 640.

At operation 650, the application activation engine 510 may compare the information about the handwriting image received through the lower-layer application with preset data stored in the memory 150.

The information about the input handwriting image that the memo layer provides to the lower-layer application may be a feedback that would be created during a natural speech of the user.

The preset data may be configured so as to render a feedback between the memo layer and the lower-layer application to be natural. To render a feedback natural, the dialog module 422 of the NLI engine 420 may compare the preset data with the input handwriting image to thereby determine whether they are highly correlated. Thus, a feedback having a high correlation with the information about the input handwriting image may be detected and provided to the memo layer.

At operation 660, upon detection of a feedback matching the input handwriting image among the preset data, the feedback may be transmitted to the memo layer through the lower-layer application.

On the contrary, if the matching feedback is not detected from the preset data, a feedback prompting the user to re-enter a handwriting image due to the absence of the matching feedback may be displayed on the display unit 140 of the terminal 100.

The controller 160 may transmit an error message as a feedback to the memo layer, recognizing an occurrence of an error to the user-input handwriting image. Since another handwriting image may be input to the memo layer, the controller 160 may transition to a waiting mode to await reception of another handwriting image through the input unit 120 at operation 665.

The waiting mode may refer to a temporary waiting state that lasts until another handwriting image is received through the input unit 120.

Upon receipt of the matching feedback, the memo layer activation engine 520 may display the received feedback in the memo layer at operation 670. Herein, a plurality of memo layers may be configured. The plurality of memo layers may be displayed as overlapped with one another according to the feedback received from the application.

The controller 160 may repeat operations 610 to 670 until receiving a specific signal, which may be a signal according to termination or deactivation of the memo layer or a signal requesting execution of the handwriting image.

Moreover, the specific signal may be a signal according to execution of another memo layer or another lower-layer application.

Accordingly, the specific signal may be a signal other than text or gestures used at operations 610 to 670.

Figure 7:
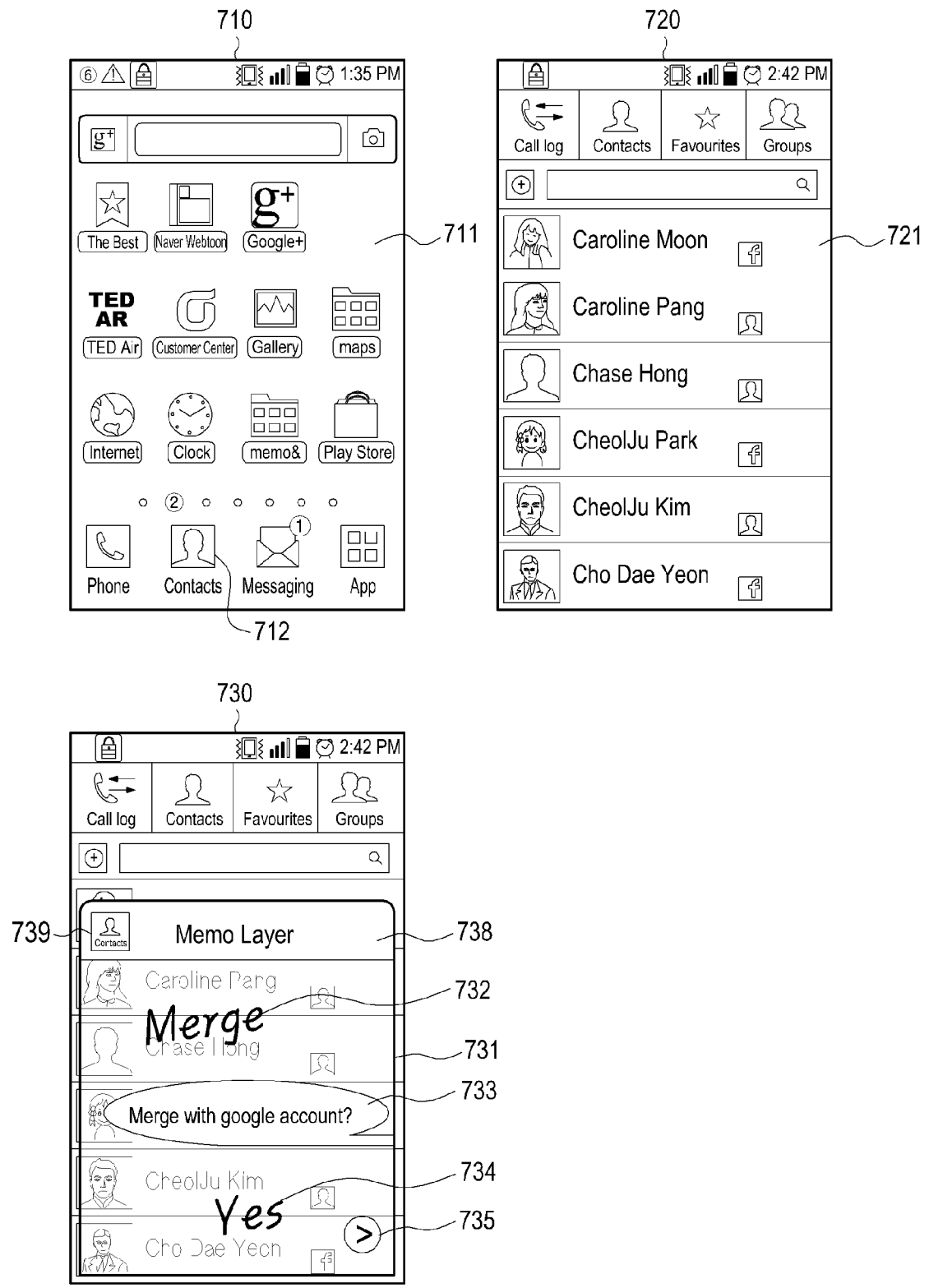
FIG. 7 illustrates a question and answer procedure between a lower-layer application and a memo layer according to an embodiment of the present disclosure.

FIG. 7 illustrates a question and answer procedure between a lower-layer application and a memo layer according to an embodiment of the present disclosure.

Referring to FIG. 7, upon selection of a Contacts icon 712 from a display screen 711 on a screen 710, an application 721 corresponding to the Contacts icon 712 may be executed. Thus, a Contacts application screen, such as a screen 720, may be displayed.

When a user gesture is input to the application 721 which is being executed on the screen 720, a memo layer 731 may be displayed overlapped on the application 721 on a screen 730.

As the application 721 may lie underneath the memo layer 731, it may be referred to as a lower-layer application.

When a handwriting image 732 is input to the memo layer 731 on the screen 730, the controller 160 may display the received handwriting image 732 in an area of the display unit 140.

The NLI engine 420 of the controller 160 may display a question 733 to be induced and a handwriting image 734 on the screen 730 in a question and answer procedure with the user. For example, the NLI engine 420 may prompt the user to reply with the handwriting image 734 by displaying "Merge with google account?" 733 on the screen 730.

If the user writes "Yes" as an answer by the memo function, the NLI engine 420 may recognize the user's intention to execute merge with a Google account from the user's input.

Information listed in the application 721 may be shared with another account on the screen 720.

Some information may be selected from the information listed in the application 721 and the memo layer 731 may be executed. Thereafter, the selected information may be associated with another account.

If the memo layer 731 is executed without selecting information from the application 721, the information listed in the application 721 may be associated with another account.

When the user writes 'Merge' in the memo layer 731, the memo layer 731 may transmit information about 'Merge' to the application 721.

The application 721 may search for data that can be the feedback 733 by comparing the received information with preset data.

The detected feedback 733 may be displayed in the memo layer 731. The handwriting image 732 may be at least one of a text, a feedback representation, an image, a pattern, a number, a special character, an email address, or the like.

If a text reception function is designed so as to support execution of a pen function, the handwriting image 732 may be input by means of a pen. Herein, with the handwriting image 732 displayed in the memo layer 731, the terminal 100 may recognize information corresponding to a gesture input of the electronic pen 200.

The handwriting image 732 may disappear when a time elapses. In this case, the input function of the electronic pen 200 may not be supported. Therefore, the terminal 100 may adjust a handwriting image display waiting time for the purpose of supporting a pen function execution.

To do so, the terminal 100 may provide a menu screen for adjusting the handwriting image display waiting time. The user may freely adjust the handwriting image display waiting time on the menu screen according to the user's preference or the user's capability of writing a reply. In the absence of any particular adjustment, the terminal 100 may set the handwriting image display waiting time according to a preliminary setting.

The memo layer 731 may receive the input handwriting image 732 and transmit it to the lower-layer application 721 through the controller 160.

The lower-layer application 721 may select the feedback 733 matching the handwriting image 732 by comparing the handwriting image 732 with preset data through the NLI engine 420 and the application activation engine 510.

The feedback 733 may be at least one of a text, a feedback representation, an image, a pattern, a number, a special character, an email address, or the like.

Once the feedback 733 is selected, the feedback 733 may be transmitted to the memo layer 731 through the lower-layer application 721 so that it can be displayed in the memo layer 731.

When the feedback 733 is displayed in the memo layer 731, an audio signal indicating display of the feedback 733 may be output to the user through the audio processor 130.

In addition, when the handwriting image 732 is input to the memo layer 731 and the data of the handwriting image 732 is transmitted to the lower-layer application 721, an audio signal may be output through the audio processor 130.

If the user reads the feedback 733 and needs to apply another input, the user may input another handwriting image in the memo layer 731.

Upon detecting the handwriting image 734, the memo layer 731 may transmit the handwriting image 734 to the lower-layer application 721.

The lower-layer application 721 may determine whether the received handwriting image 734 represents an execution command or an additional reply (feedback) is needed by comparing the handwriting image 734 with the preset data.

If the handwriting image 734 represents an execution command, the controller 160 may execute a program according to the execution command.

If an additional reply is needed, the lower-layer application 721 may transmit an additional reply to the memo layer 731 and the additional reply may be displayed in the memo layer 731.

Meanwhile, if the lower-layer application 721 receives the handwriting image 734 and a signal of an execution button 735 together, it may execute the program immediately without comparing the handwriting image 734 with the preset data.

When the handwriting image 734 is input to a partial area of the memo layer 731 while the feedback 733 received from the lower-layer application is displayed or within a time after the handwriting image 732 is displayed, the controller 160 may regard the handwriting image 734 as a reply to the feedback 733.

The feedback 733 may be changed according to the handwriting image 732 input to the memo layer 731.

In relation to the description regarding operations 610 and 620 of FIG. 6, a feedback indicating a function of the lower-layer application 721 associated with the memo layer 731 may be displayed in a partial area 738 of the memo layer 731.

Further, a feedback implicitly indicating what handwriting image the user is to input may be displayed in the partial area 738.

An icon representing the application 721 associated with the memo layer 731 may be displayed in another partial area 739 of the memo layer 731.

The user may input an appropriate handwriting image in a partial area of the memo layer 731, referring to the feedback or the icon displayed in the area 738 or 739.

When the terminal 100 collects gesture recognition information corresponding to a gesture input for writing a reply, the terminal 100 may process the collected gesture recognition information as information about the received handwriting image.

More specifically, when the user finishes inputting a reply, the terminal 100 may activate a function corresponding to the received handwriting image by background processing.

For example, if the received handwriting image corresponds to a text message transmission function, the terminal 100 may execute a text message application to activate the text message transmission function. The terminal 100 may automatically extract sender information, create a text message including the gesture recognition information corresponding to a written note, and automatically send the text message.

Meanwhile, when the electronic pen 200 is apart from the display unit 140 farther than a certain distance and thus, is located beyond recognition, or a gesture, for example, information corresponding to a period is input, the terminal 100 may determine that the user has finished inputting the reply.

Moreover, when the user starts to input the reply, the execution button 735 may be displayed. Thereafter, the user may notify completion of inputting the reply by selecting the execution button 735.

Upon completion of the input of the handwriting images on the screen 730, the terminal 100 may automatically return to the screen 720 or may display a handwriting image transmission/reception history screen by releasing its sleep state so that the history of transmitted and received handwriting images may be confirmed.

The screen 730 may be changed according to the characteristics of transmitted/received handwriting images. For example, the screen 730 may be a handwriting image transmission/reception screen or a chat screen.

The memo layer 731 may be rendered semi-transparent on the screen 730 so that the underlying lower-layer application 721 may be seen semi-transparently through the memo layer 731.

The transparency of the memo layer 731 may be changed by a transparency setting. Accordingly, as the memo layer 731 gets a different transparency degree, the brightness or darkness of the lower-layer application 721 seen through the memo layer 731 may be changed.

While the memo layer 731 is being executed on the screen 730, another memo layer may be executed. The other memo layer may be associated with the application associated with the memo layer 731 or another application. Moreover, the other memo layer may have the same functionality of the memo layer 731. Furthermore, the other memo layer may transmit data to or receive data from the memo layer 731 in conjunction with each other. The transmitted or received data may be transmitted to the lower-layer application 721.

The lower-layer application 721 may select an appropriate feedback by comparing the received data with preset data. The selected feedback may be displayed on the memo layer 731 or the other memo layer. When the feedback is displayed in the memo layer 731, the other memo layer may be displayed over the memo layer 731 and may be rendered semi-transparent so that the memo layer 731 may be seen through the other memo layer.

Figure 8:
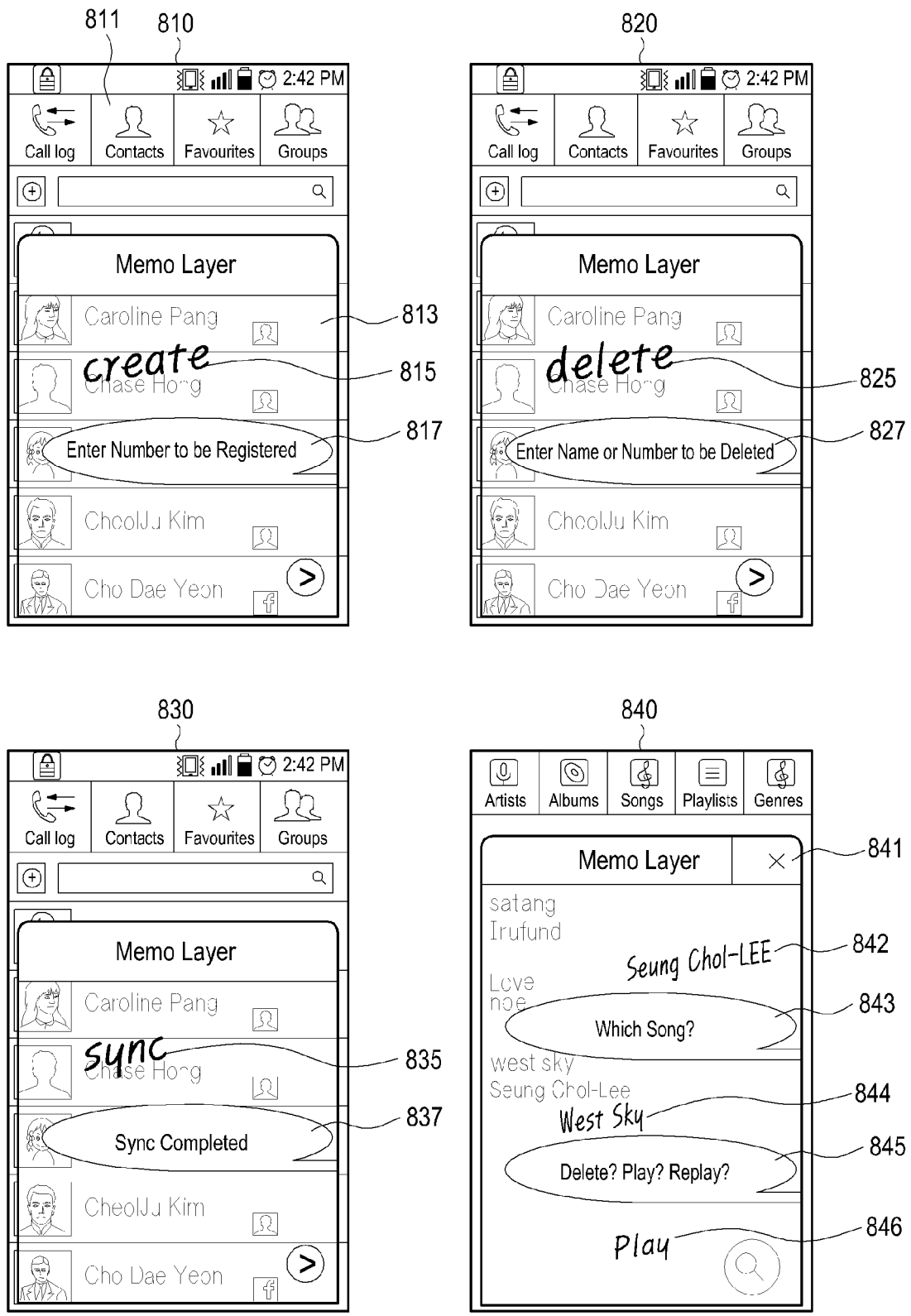
FIG. 8 illustrates question and answer procedures between a lower-layer application and a memo layer according to embodiments of the present disclosure.

FIG. 8 illustrates question and answer procedures between a lower-layer application and a memo layer according to embodiments of the present disclosure.

Referring to FIG. 8, different replies are displayed in the memo layer according to the types of feedback input to the lower-layer application and the memo layer according to various embodiments of the present disclosure.

A Contacts icon 811 may be selected, a lower-application 812 corresponding to the Contacts icon 811 may be executed and displayed, and a memo layer 813 may be displayed overlapped on the lower-layer application 812 on a screen 810, as done in FIG. 7.

A feedback 817 matching text 815 input to the memo layer 813 may be displayed as a reply to the text 815 on the memo layer 813.

Text 825 and 835 different from the text 815 may be input to the memo layer 813 with the same underlying lower-layer application as displayed on the screen 810, on screens 820 and 830.

Different feedback 827 and 837 may be displayed on the memo layer 813 according to the input text 825 and 835.

This is because the controller 160 searches for an appropriate feedback matching text received at the lower-layer application by comparing the received text with preset data and displays the detected feedback on the memo layer 813.

A different application from the lower-layer application displayed on the screen 810 is executed on a screen 840. The application displayed on the screen 840 is a music-related application.

A memo layer 841 may be executed and displayed on this application and a text or an icon indicating the application may be displayed in a part of the memo layer 841, for example, at a top end of the memo layer 841.

When a text 842 is input to the memo layer 841, the memo layer 841 may transmit the text 842 to the application. The application may select an appropriate feedback 843 by comparing information about the received text with a preset text.

The controller 160 may control display of the selected feedback 843 on the memo layer 841.

The user may read the selected feedback 843 on the memo layer 841 displayed on the screen 840. If the user needs to reply additionally, the user may input another text 844 to the memo layer 841.

The memo layer 841 may transmit the input text 844 to the application and the application may detect an appropriate feedback 845 by comparing information about the received text 844 with a preset text.

The controller 160 may control display of the additional appropriate feedback 845 on the memo layer 841.

The user may input a text 846 as a further reply to the feedback 845 on the memo layer 841. Moreover, the user may input a part of the feedback 845 as the text 846. In addition, the user may input a gesture to the memo layer 841, for selecting a part of the feedback 845.

Upon selection of a part of the feedback 845 by the gesture, the memo layer 841 may transmit information about the selected part of the feedback 845 to the application. The application may execute a function according to the information about the selected part of the feedback 845.

For example, upon selection of 'Play' from the feedback 845 'Delete? Play? Replay?', a song 'West Sky' being the already input text 844 is played.

The part of the feedback 845 may be selected in various manners, for example, by touching, making a gesture to, or speaking text being the part of the feedback 845.

FIGS. 9 to 16 illustrate various application examples of the embodiment of FIG. 7.

Figure 9:
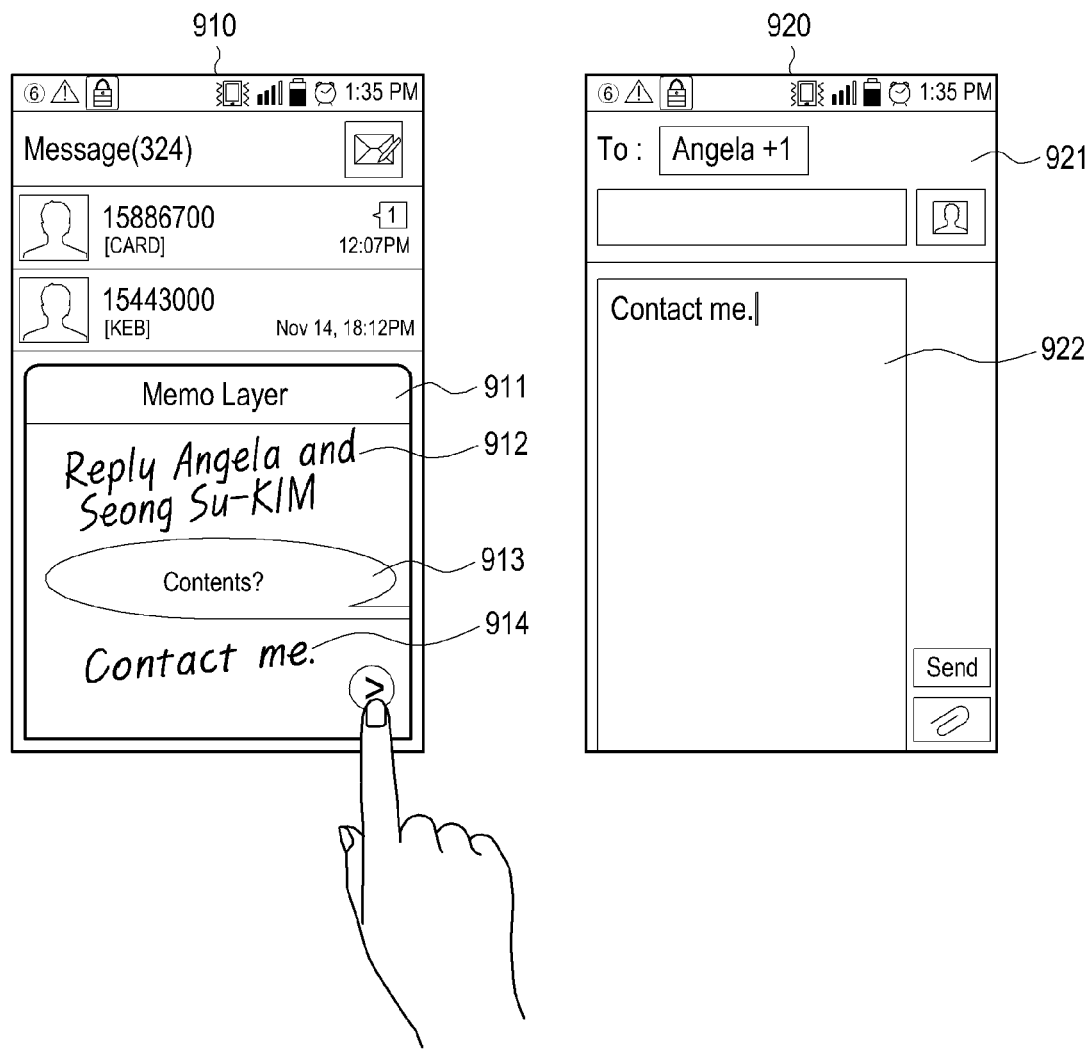
FIG. 9 illustrates a method for transmitting a message to a plurality of users using a lower-layer application and a memo layer according to an embodiment of the present disclosure.

FIG. 9 illustrates a method for sending a message to a plurality of users using a lower-application and a memo layer according to an embodiment of the present disclosure.

Referring to FIG. 9, a message-related application may be executed and a memo layer 911 may be displayed overlapped on the message-related application on a screen 910.

When the user inputs text 912 to the memo layer 911, a feedback from the message-related application may be displayed as a reply 913 on the memo layer 911. The text 912 may include an execution command and information about recipients.

For example, the text 912 'Reply Angela and Seong Su-KIM' is divided into an execution command 'Reply' and information about recipients 'Angela and Seong Su-KIM'.

The execution command may be a command requesting message transmission to the recipients following the execution command.

After the reply 913 is displayed on the memo layer 911, the user may input a message 914 to be sent to the recipients in a partial area of the memo layer 911.

The input message 914 may be transmitted to the message-related application through the memo layer 911.

To send the input message 914 to the recipients, the message-related application may acquire information about the recipients from pre-stored data in the memory 150. The message-related application may send the message 914 to the recipients based on the acquired recipient information.

The message-related application may send the message 914 immediately to the recipients, or a message input screen 921 may be displayed on a screen 920 so that the user may confirm the message 914. The user may edit or add to the message 914 in a message input window 922.

The user may confirm the contents in the message input window 922. If there is no need for amending the message 914 or the message 914 has been amended, the user may send the message displayed in the message input window 922 to the recipients by selecting a send button.

Figure 10:
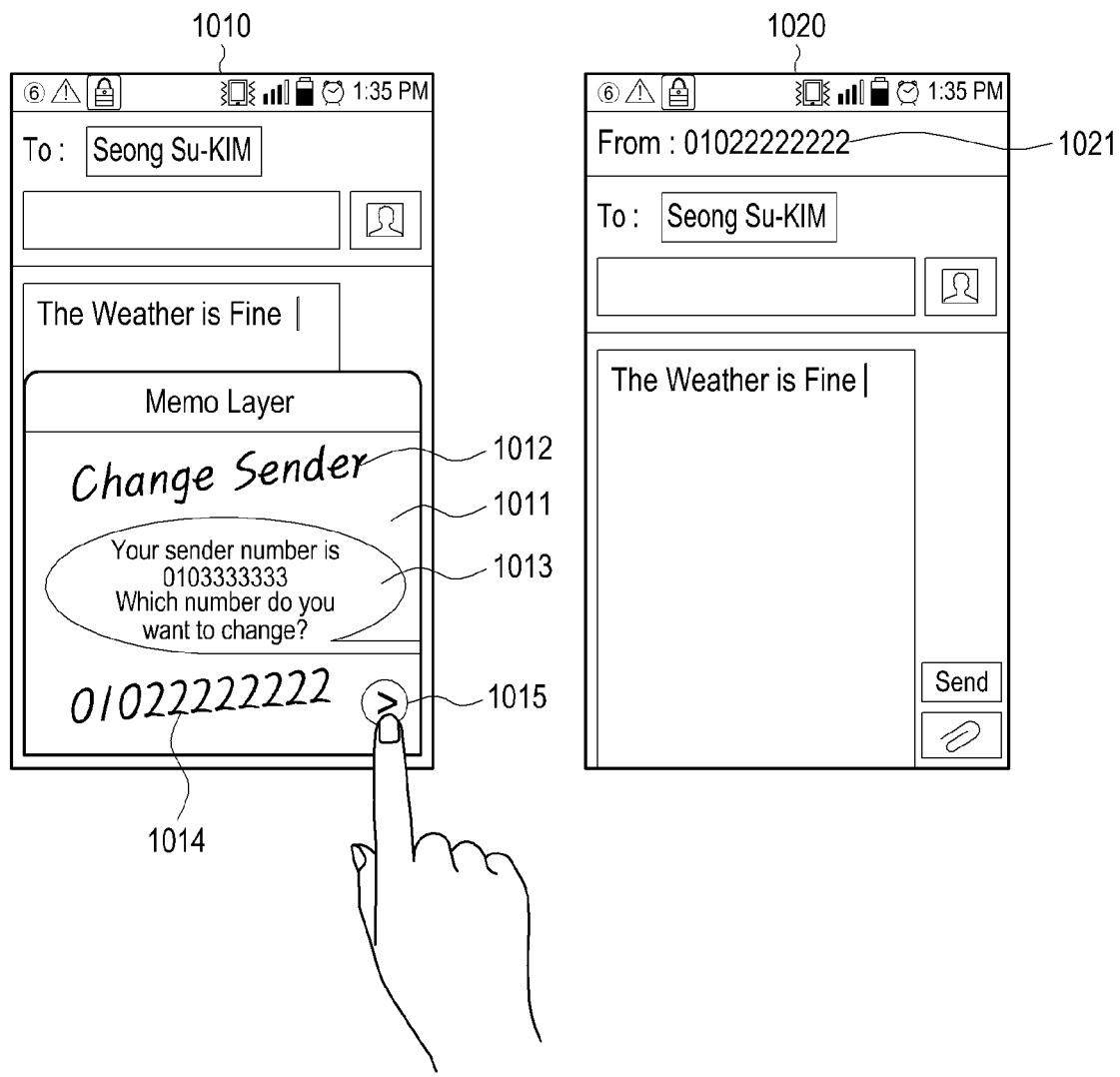
FIG. 10 illustrates a method for changing information about a sender using a memo layer according to an embodiment of the present disclosure.

FIG. 10 illustrates a method for changing information about a sender using a memo layer according to an embodiment of the present disclosure.

Referring to FIG. 10, a memo layer 1011 may be executed on the screen 920 and displayed overlapped on the message input screen 921 on a screen 1010.

If the user inputs a feedback 1012 to the memo layer 1011 to change sender information, the controller 160 may receive the feedback 1012 through the memo layer 1011 and control the lower-layer application to detect an appropriate feedback 1013 by comparing the feedback 1012 with pre-stored data and display the feedback 1013 as a reply on the memo layer 1011.

When the feedback 1013 is displayed as a reply on the memo layer 1011, the user may input changed sender information 1014 to a partial area of the memo layer 1011.

When finishing input of the changed sender information 1014, the user may select an execution button 1015 so that the changed sender information 1014 may be transmitted to the lower-layer application.

The changed sender information 1014 may be displayed in a sender information input window 1021 being a partial area of the display on a screen 1020.

When the changed sender information 1014 is displayed in the sender information input window 1021, the memo layer 1011 may disappear.

Before the sender information is changed, the sender information input window 1021 may not be displayed on the screen 1020. For example, when the sender information is changed, the sender information input window 1021 may be displayed on the screen 1020.

Unlike the screen 1010, the sender information may be displayed in a partial area of the screen.

While the method for changing sender information has been described in FIG. 10, this method is also applicable as a method for changing recipient information or other information.

Figure 11:
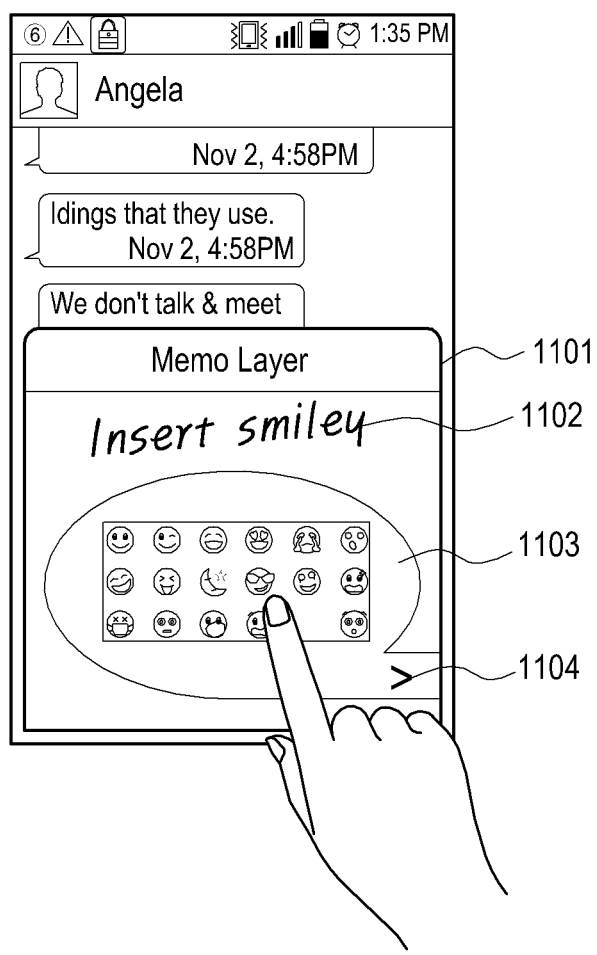
FIG. 11 illustrates a method for invoking emoticon images using a memo layer according to an embodiment of the present disclosure.

FIG. 11 illustrates a method for invoking emoticon images using a memo layer according to an embodiment of the present disclosure.

Referring to FIG. 11, it may occur that an emoticon image is needed during writing a message. If a multi-step input process or a complicated selection process is used for invoking an emoticon menu and selecting a necessary emoticon image, this may be inefficient.

To decrease the complexity, a memo layer 1101 may be used. For example, the memo layer 1101 may be invoked by inputting a gesture on a screen during writing a message and an emoticon invoking command 1102 may be input to the memo layer 1101. Thereafter, the controller 160 may search for emoticon images 1103 from a lower-layer application and display them on the memo layer 1101.

If one of the emoticon images 1103 is selected, information about the selected emoticon image may be transmitted to the lower-layer application.

Moreover, when an execution button 1104 is selected after one of the emoticon images 1103 is selected, the information about the selected emoticon image may be transmitted to the lower-layer application.

The selected emoticon image may be inserted into a part of the message. An example of selecting an emoticon image during writing a message has been described above with reference to FIG. 11. The emoticon image selection method may be implemented for various message-related applications, such as Kakao Talk.

Figure 12:
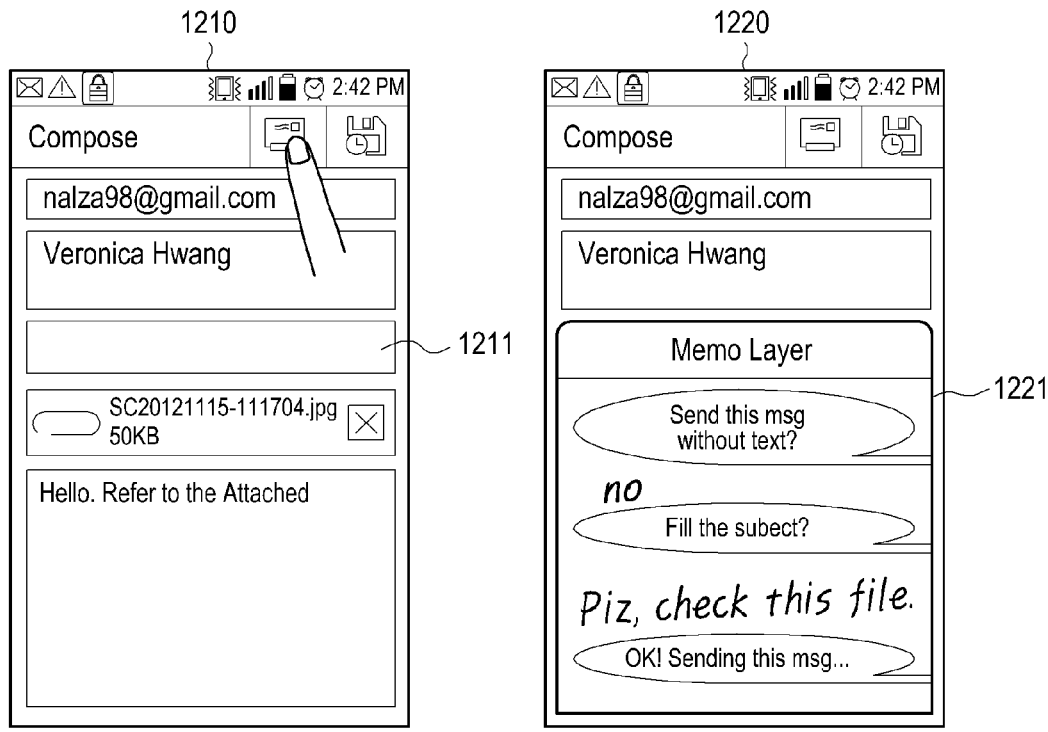
FIG. 12 illustrates a method for providing a feedback regarding an item needing an input by a memo layer, when a part of a mail is empty during an execution of a mail transmission, according to an embodiment of the present disclosure.

FIG. 12 illustrates a method for providing a feedback regarding an item needing an input by a memo layer, when a part of a mail is empty during execution of mail transmission, according to an embodiment of the present disclosure.

Referring to FIG. 12, when a mail transmission is executed on a screen 1210, a memo layer 1221 interworking with a mail application may determine contents input to the mail application.

When a subject input area or a body input area 1211 is left empty, that is, in the absence of an input in an input area 1211 during execution of mail transmission on the screen 1210, the memo layer 1221 may be displayed and a warning feedback may be displayed on the memo layer 1221 on a screen 1220. For example, the warning feedback may be 'Send this msg without text?'.

The user may input a handwriting image corresponding to contents to be input to the subject or body input area 1211 to the memo layer 1221. The memo layer 1221 monitors the presence of the handwriting image in the subject input area or the body input area 1211. The memo layer 1221 may transmit the handwriting image in the subject input area or the body input area 1211 to the mail application.

The memo layer 1221 may transmit the input handwriting image to the mail application and the mail application may send a mail added with the received handwriting image.

If the user has nothing to add to the subject input area or the body input area 1211, the user may input a text or a symbol, such as no or X, to a partial area of the memo layer 1221 in order to indicate nothing to add.

Upon receipt of the text or symbol indicating nothing to add, the memo layer 1221 may transmit the mail with the input area left empty through the mail application.

Figure 13:
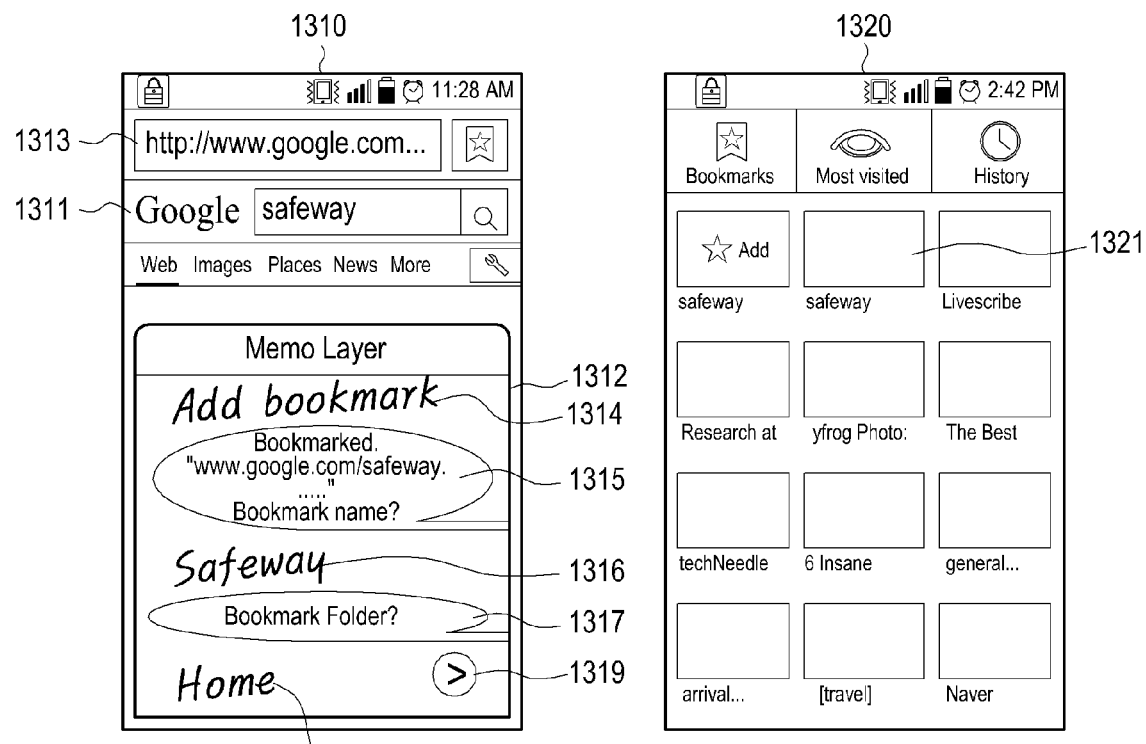
FIG. 13 illustrates a method for bookmarking a Web page using a memo layer according to an embodiment of the present disclosure.

FIG. 13 illustrates a method for bookmarking a Web page using a memo layer according to an embodiment of the present disclosure.

Referring to FIG. 13, while a site is searching for on a Web page 1311, a memo layer 1312 may be executed and displayed overlapped on the Web page 1311 on a screen 1310 in order to bookmark the site.

When the user inputs a bookmark command 1314 to the memo layer 1312, the memo layer 1312 may transmit the bookmark command 1314 to a bookmark application.

The bookmark application may bookmark an Internet address 1313 of the Web page 1311 according to the received bookmark command 1314.

The bookmark application may transmit a question 1315 asking whether the bookmarked address is correct or what is the name of the bookmark to the memo layer 1312.

After receiving information about a bookmark name 1316, the bookmark application may transmit a question 1317 asking in which folder to store the bookmark to the memo layer 1312.

When reading the question 1317, the user may input a folder name 1318 as a reply to a partial area of the memo layer 1312.

The bookmark application may bookmark the Internet address 1313 in the folder having the name 1318 a certain time after the folder name 1318 is input to the memo layer 1312.

Moreover, if the folder name 1318 is input to the partial area of the memo layer 1312 and an execution button 1319 is selected, the bookmark application may bookmark the Internet address 1313 in the folder having the name 1318.

A screen 1320 displays a bookmarking result 1321 of the Internet address 1313 according to the bookmark command 1314 executed on the screen 1310.

The user may confirm on the screen 1320 whether the intended Internet address 1313 has been bookmarked correctly. In the presence of an error to the bookmarking, the user may re-execute bookmarking by executing the memo layer 1312 again.

Figure 14:
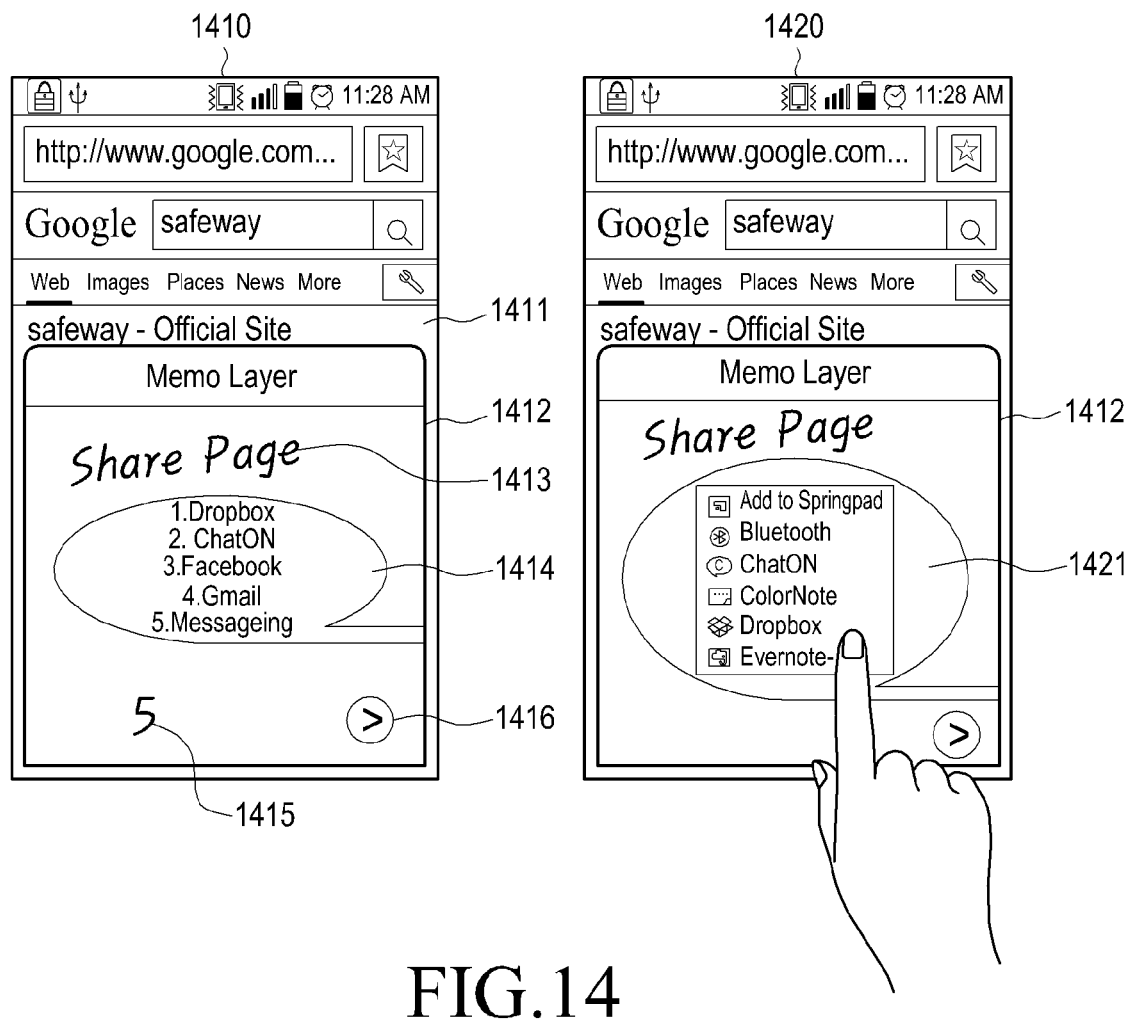
FIG. 14 illustrates a method for sharing a Web page with another user using a memo layer according to an embodiment of the present disclosure.

FIG. 14 illustrates a method for sharing a Web page with another user using a memo layer according to an embodiment of the present disclosure.

Referring to FIG. 14, when the user wants to share a Web page 1411 during searching the Web page 1411, the user may execute a memo layer 1412 and display the memo layer 1412 overlapped on the Web page 1411 on a screen 1410.

The user may input a share command 1413, for example, 'Share Page' to a partial area of the memo layer 1412. The memo layer 1412 may transmit information about the share command 1413 to a share application.

The share application may transmit information 1414 about applications that enable sharing of the Web page 1411 to the memo layer 1412.

The user may select a number labeled before the applications in the application information 1414.

A certain time after the user inputs the number to the memo layer 1412, an application corresponding to the number may be executed.

If the user inputs the number to a partial area of the memo layer 1412 and selects an execution button 1416, the application corresponding to the number may be executed.

While the user selects the number and inputs it to the partial area of the memo layer 1412 on the screen 1410, the user may select an intended application by touching it using a screen scroll function 1421 and thus, execute the application on a screen 1420, instead of selecting and inputting the number.

Figure 15:
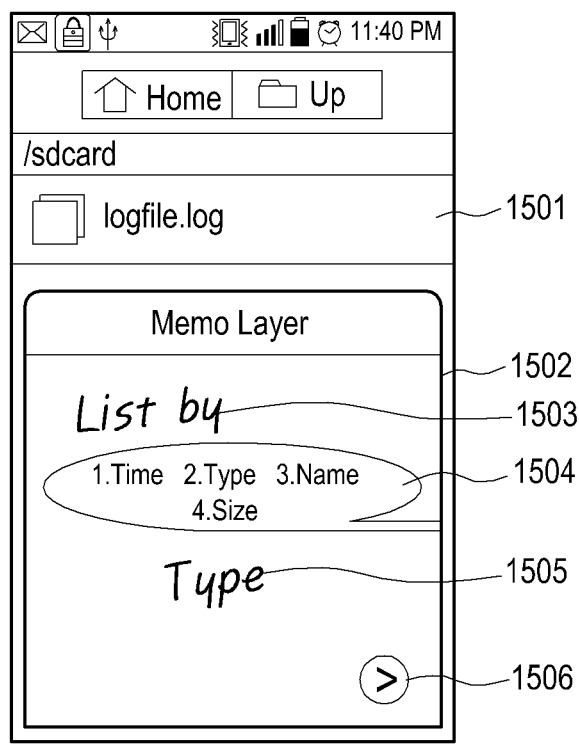
FIG. 15 illustrates a method for sorting files in My Folder using a memo layer according to an embodiment of the present disclosure.

FIG. 15 illustrates a method for sorting files in My Folder using a memo layer according to an embodiment of the present disclosure.

Referring to FIG. 15, with a My Folder application 1501 executed, a memo layer 1502 may be executed and displayed overlapped on the My Folder application 1501.

When a sort command 1503, for example, 'list by' is input to a partial area of the memo layer 1502, the My Folder application 1501 associated with the memo layer 1502 may receive information about the sort command 1503.

The My Folder application 1501 may transmit sorting options 1504 to the memo layer 1502.

Upon selection of one of the sorting options 1504, for example, 'Type' 1505, files stored in My Folder may be re-sorted according to the selected option.

A certain time after the at least one of the sorting options 1504 is selected, the files may be sorted according to the selected option.

Moreover, if an execution button 1506 is selected after selection of at least one of the sorting options 1504, the files may be sorted according to the selected option.

Figure 16:
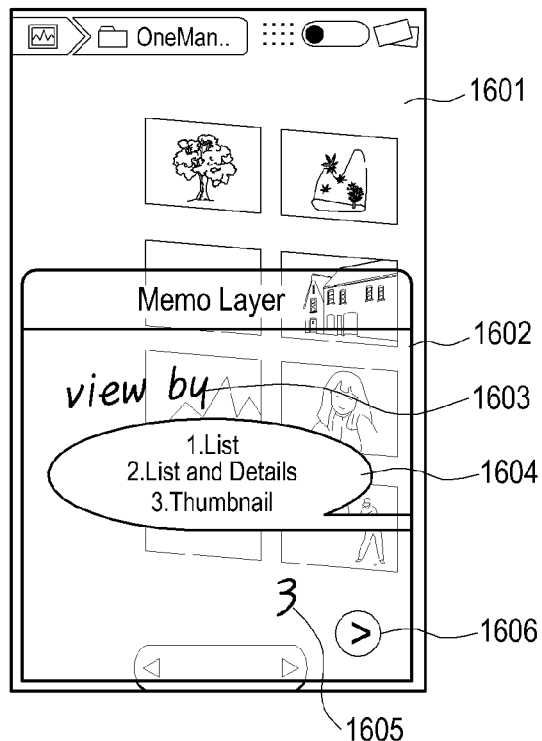
FIG. 16 illustrates a method for sorting image files in a gallery using a memo layer according to an embodiment of the present disclosure.

FIG. 16 illustrates a method for sorting image files in a gallery using a memo layer according to an embodiment of the present disclosure.

Referring to FIG. 16, with a gallery application 1601 executed, a memo layer 1602 may be executed and displayed overlapped on the gallery application 1601.

When a sort command 1603, for example, 'view by' is input to a partial area of the memo layer 1602, the gallery application 1601 associated with the memo layer 1602 may receive information about the sort command 1603.

The gallery application 1601 may transmit sorting options 1604 to the memo layer 1602.

Upon selection of the at least one of the sorting options 1604, for example, '3' 1605, image files stored in the gallery may be re-sorted according to the selected option.

A certain time after the at least one of the sorting options 1604 is selected, the image files may be sorted according to the selected option.

Moreover, if an execution button 1606 is selected after selection of the at least one of the sorting options 1604, the image files may be sorted according to the selected option.

The memo layer 1602 may be rendered semi-transparent so that the gallery application 1601 under the memo layer 1602 may be seen semi-transparently through the memo layer 1602.

Figure 17:
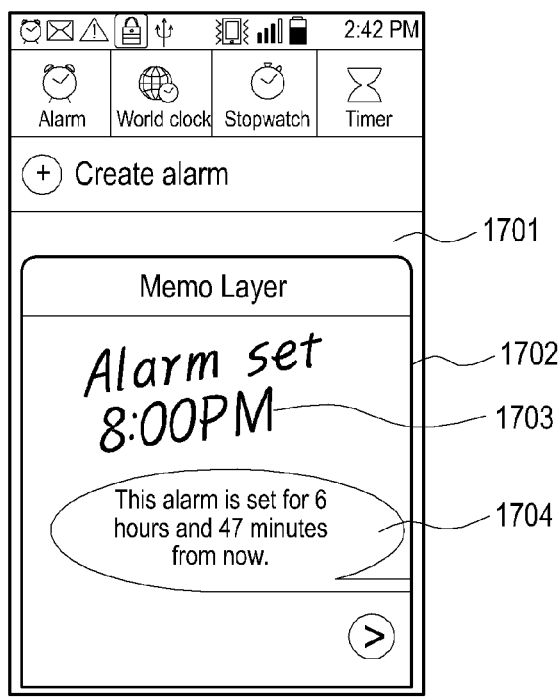
FIG. 17 illustrates a method for setting an alarm using a memo layer according to an embodiment of the present disclosure.

FIG. 17 illustrates a method for setting an alarm using a memo layer according to an embodiment of the present disclosure.

Referring to FIG. 17, with an alarm application 1701 executed, a memo layer 1702 may be executed and displayed overlapped over the alarm application 1701.

If a setting command 1703, for example, 'Alarm set 8:00 PM' is input to a partial area of the memo layer 1702, the alarm application 1701 associated with the memo layer 1702 may receive information about the setting command 1703.

The alarm application 1701 may transmit set information 1704 to the memo layer 1702 according to the received information. Thus, the user may confirm the set information 1704.

If the set information 1704 is erroneous, the memo layer 1702 may display an error message in a partial area of the memo layer 1702 so that the user may re-input the setting command 1703.

For example, the set information 1704 displayed in a partial area of the memo layer 1702 may be a feedback requesting re-input due to an error.

Figure 18:
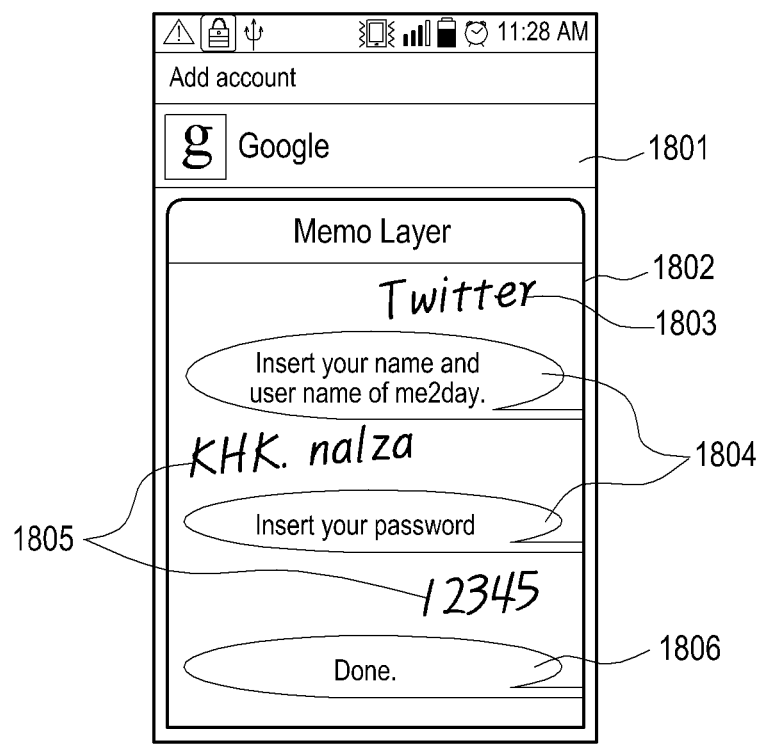
FIG. 18 illustrates a method for registering an account using a memo layer according to an embodiment of the present disclosure.

FIG. 18 illustrates a method for registering an account using a memo layer according to an embodiment of the present disclosure.

Referring to FIG. 18, with an account application 1801 executed, a memo layer 1802 may be executed and displayed overlapped on the account application 1801.

When a register command 1803 is input to a partial area of the memo layer 1802, the account application 1801 associated with the memo layer 1802 may receive information about the register command 1803.

The register command 1803 may be information about a Web page, for example, 'Twitter'.

If information about a Web site to be registered is input to a partial area of the memo layer 1802 that has been executed and displayed overlapped on the executed account application 1801, the account application 1801 may perform a Web registration procedure.

The account application 1801 may transmit additional questions 1804 to acquire information used for registration according to the register command 1803 to the memo layer 1802.

Additional information 1805 may be input as replies to a partial area of the memo layer 1802.

The account application 1801 may determine that further information is not needed by analyzing the additional information 1805 received through the memo layer 1802.

In this case, the account application 1801 may transmit text 1806 indicating completed registration to the memo layer 1802.

In an implementation, it may be further contemplated that while a specific application is being executed in the terminal 100, the specific application is controlled using a memo layer.

For example, during execution of a music play application as a lower-layer application in progress, the terminal 100 may monitor whether the user has invoked the memo layer.

When the user invokes the memo layer, the terminal 100 may activate the menu layer having a title and an input menu button on a screen. For example, the memo layer having the title and the input menu button may be displayed overlapped on the execution screen of the music play application.

For example, the title of the memo layer may be displayed as 'Enter a song!'.

The terminal 100 monitors whether the user has written an intended note (e.g., 'Alone') and pressed the displayed input menu button.

Upon detecting a user signal, for example, upon detecting pressing of the input menu button, the terminal 100 may recognize the note written on the memo layer as 'Alone' and provide the text 'Alone' to the executed music play application.

The music play application searches for a song having the title 'Alone' and play the detected song. A song search range may be determined according to a user setting. For example, the song search range may be set to songs stored in the terminal 100 or a Web site that provides a music service.

To set the search range to the Web site, authentication information for the Web site may be managed by the terminal 100 or input by the user.

In a case of a plurality of search results, a plurality of songs corresponding to the search results may be sequentially played or the user may select a song from among the plurality of songs. For example, the search results are listed on a screen so that the user may select a song.

If the terminal 100 fails to detect the received handwriting image 'Alone' in preset data, the terminal 100 may display a feedback on the memo layer.

Thereafter, the user may input another handwriting image to a partial area of the memo layer in response to the feedback.

After recognizing the additional handwriting image, the controller 160 of the terminal 100 may transmit information about the additional handwriting image to the music play application and control execution of a command corresponding to the additional handwriting image in the music play application.

In another embodiment of the present disclosure, during execution of a chat application in progress, the terminal 100 may control the chat application using a memo layer.

The controller 160 of the terminal 100 may control activation of a chat function as a background process. The controller 160 may also control automatic transmission of gesture recognition information that has been input while a message is being output on a screen as a response message to the received chat message.

During the operation, the controller 160 may control opening of a chat room including the received chat message or posting of the received chat message and the response message to a chat room preliminarily opened in relation to the sender of the received chat message.

In the case of an e-mail, the controller 160 may also support transmission of a reply e-mail in the same manner as in a text message service. For example, when an immediate reply is to be transmitted for a received e-mail message, the controller 160 may extract e-mail information about an e-mail sender indicated in the message and transmit an e-mail including user-input gesture recognition information as contents to the sender.

As is apparent from the above description, an electronic device and a method for operating the same can support a pen function table mapped to the electronic pen 200 so that a user may use various functions conveniently in an environment using the electronic pen 200.

Therefore, the user can use more functions based on the type of a currently activated function, electronic pen state information, or gesture recognition information, alone or in combination.

An electronic device can be configured with a terminal supporting a memo function through a touch panel in such a manner that a memo function application is associated with another application and a handwriting image and a feedback are exchanged between the memo function application and the other application, thereby forming natural dialogue-type feedback.

The terminal 100 may further include additional modules according to the specification of the terminal 100. For example, if the terminal 100 is a communication terminal, it may further include components that have not been described above, such as a short-range communication module for conducting a short-range communication, an interface for a wireless or a wired data transmission and reception, an Internet communication module for performing an Internet function by communicating with the Internet, and a digital broadcasting module for receiving and playing digital broadcasting.

Along with the trend of digital devices toward convergence, these components may be modified in various manners. Components equivalent to the above-described components may be added to the terminal 100.

Specific components may be removed or replaced in the terminal 100 according to the specification of the terminal 100.

In accordance with an embodiment of the present disclosure, the term 'terminal' may cover a broad range of devices including all information communication devices, multimedia devices, and their application devices, such as a Portable Multimedia Player (MPM), a digital broadcasting player, a Personal Digital Assistant (PDA), a music player (e.g., a Motion Pictures Expert Group (MPEG-1 or MPEG-2) Audio Layer 3 (MP3) player), a portable game console, a smart phone, a laptop, and a handheld Personal Computer (PC), as well as all mobile communication terminals operating in conformance to the communication protocols of various communication systems.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an application in an electronic device having a touch screen, the method comprising:
   executing, by a processor, an application and displaying, by a display unit, the executed application on the touch screen;
   detecting, by the processor, a gesture on the touch screen during execution of the application;
   displaying, by the display unit, a memo layer overlapped on the application according to the detected gesture, wherein the memo layer is for displaying a handwriting input to be provided to the application and for displaying feedback received from the application;
   receiving, by the processor, a handwriting image in the memo layer;
   recognizing, by the processor, the received handwriting image and comparing the recognized handwriting image with preset data; and
   displaying, by the processor, the feedback received from the application in the memo layer according to a comparison result.

2. The method of claim 1, wherein, if a plurality of handwriting images are input, a plurality of feedback corresponding to the handwriting images is displayed at different positions in the memo layer.

3. The method of claim 1, wherein the memo layer is semi-transparent and when the memo layer is displayed overlapped on an execution screen of the application, the application shows through the memo layer.

4. The method of claim 1, wherein, if a plurality of memo layers are displayed, the memo layers are layered with one another according to the feedback received from the application.

5. The method of claim 1, wherein, if a plurality of feedback is generated from the application, the plurality of feedback is displayed in a part of the memo layer.

6. The method of claim 5, wherein the plurality of feedback includes commands for executing functions of the application and, if a part of an area in which the plurality of feedback is displayed is selected, at least one command included in the selected part is executed.

7. The method of claim 1, wherein, if an application other than the executed application is executed, another memo layer associated with the other application is executed.

8. The method of claim 7, wherein the feedback is displayed differently in the other memo layer according to a function of the other application.

9. The method of claim 1, wherein the handwriting image and the feedback are sequentially displayed in a handwriting input area and a display area of the memo layer.

10. The method of claim 1, wherein the handwriting image and the feedback form a dialogue.

11. The method of claim 1, wherein the handwriting image or the feedback is at least one of a text, a feedback, an image, a pattern, a number, a special character, or an email address.

12. A non-transitory processor readable medium for storing a computer program of instructions configured to be readable by at least one processor for instructing the at least one processor to execute a computer process for performing the method as recited in claim 1.

13. An electronic device having a touch screen, the electronic device comprising:
   a display unit configured:
      to display an executed application on the touch screen, display a memo layer overlapped on the application, wherein the memo layer is for displaying a handwriting input to be provided to the application and for displaying feedback received from the application,
      to receive a handwriting image in the memo layer, and
      to display the handwriting image in the memo layer; and
   a controller configured:
      to detect a gesture on the touch screen during execution of the application,
      to recognize the received handwriting image, compare the recognized handwriting image with preset data, and
      to control display of the feedback received from the application in the memo layer according to a comparison result.

14. The electronic device of claim 13, wherein, if a plurality of handwriting images are input, the display unit displays a plurality of feedback corresponding to the handwriting images at different positions in the memo layer.

15. The electronic device of claim 13, wherein, if a plurality of feedback is generated from the application, the controller controls display of the plurality of feedback in a part of the memo layer.

16. The electronic device of claim 15, wherein the plurality of feedback includes commands for executing functions of the application and, if a part of an area in which the plurality of feedback is displayed is selected, the controller controls execution of at least one command included in the selected part.

17. The electronic device of claim 13, wherein, if an application other than the executed application is executed, the controller controls execution of another memo layer associated with the other application.

18. The electronic device of claim 17, wherein the controller controls different display of the feedback in the other memo layer according to a function of the other application.

* * * * *